United States Patent
Lau et al.

(10) Patent No.: US 8,438,481 B2
(45) Date of Patent: May 7, 2013

(54) USER INTERFACE FOR MULTIFUNCTION DEVICE

(75) Inventors: Dannie Lau, Santa Clarita, CA (US); Darren Kelly O'Brien, Apple Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 1264 days.

(21) Appl. No.: 11/969,406

(22) Filed: Jan. 4, 2008

(65) Prior Publication Data

US 2008/0229249 A1 Sep. 18, 2008

Related U.S. Application Data

(63) Continuation of application No. 11/779,152, filed on Jul. 17, 2007, now Pat. No. 7,788, 600.

(60) Provisional application No. 60/839,488, filed on Aug. 22, 2006.

(51) Int. Cl.
*G06F 3/00* (2006.01)

(52) U.S. Cl.
USPC ........... 715/716; 715/719; 715/864; 715/970; 701/36; 701/418; 701/432

(58) Field of Classification Search ............... 715/716, 715/719, 864, 970; 701/36, 201, 213, 418, 701/432

See application file for complete search history.

(56) References Cited

U.S. PATENT DOCUMENTS

| | | | |
|---|---|---|---|
| 5,774,540 A | 6/1998 | Davidson et al. | |
| 5,961,570 A * | 10/1999 | Inamori | 701/200 |
| 6,819,990 B2 * | 11/2004 | Ichinose | 701/36 |
| 7,035,720 B2 | 4/2006 | Taxis | |
| 7,415,352 B2 * | 8/2008 | Olcott | 701/211 |
| 7,505,062 B2 * | 3/2009 | Davidson et al. | 348/77 |
| 7,643,917 B2 | 1/2010 | Kolletzki | |
| 7,882,433 B2 * | 2/2011 | Callaway et al. | 715/700 |
| 7,941,753 B2 * | 5/2011 | Meisels et al. | 715/751 |
| 2001/0052912 A1 * | 12/2001 | Ishii et al. | 345/835 |
| 2002/0054053 A1 | 5/2002 | Naimi et al. | |
| 2002/0059178 A1 * | 5/2002 | Hirabayashi et al. | 707/1 |
| 2003/0048309 A1 * | 3/2003 | Tambata et al. | 345/810 |
| 2003/0117427 A1 * | 6/2003 | Haughawout et al. | 345/710 |
| 2003/0210281 A1 * | 11/2003 | Ellis et al. | 345/838 |
| 2003/0216846 A1 * | 11/2003 | Chang | 701/36 |
| 2004/0100479 A1 * | 5/2004 | Nakano et al. | 345/700 |
| 2005/0034081 A1 | 2/2005 | Yamamoto et al. | |

(Continued)

FOREIGN PATENT DOCUMENTS

DE 298 21 903 U1 5/1999

*Primary Examiner* — Ryan Pitaro
(74) *Attorney, Agent, or Firm* — Brinks Hofer Gilson & Lione

(57) ABSTRACT

A graphical user interface for use in connection with a device having navigation and media functionality includes a navigation interface and a media interface that each have having a plurality of screens adapted to facilitate interaction between a user and a navigation application and a media application, respectively. An application interface toggle button it is actuatable on at least one of the plurality of navigation interface screens and on at least one of the plurality of media interface screens. Actuation of the application interface toggle button from a navigation interface screen invokes display of a media interface screen, and actuation of the application interface toggle button from a media interface screen invokes display of a navigation interface screen.

26 Claims, 30 Drawing Sheets

Track – Artist Names

U.S. PATENT DOCUMENTS

| | | | |
|---|---|---|---|
| 2005/0043871 A1 | 2/2005 | Endo et al. | |
| 2005/0227649 A1* | 10/2005 | Chestnut et al. | 455/154.1 |
| 2006/0230336 A1* | 10/2006 | Chikamura | 715/501.1 |
| 2006/0277454 A1* | 12/2006 | Chen | 715/500.1 |
| 2007/0016874 A1* | 1/2007 | Chaudhri | 715/787 |
| 2007/0022378 A1 | 1/2007 | Hamada | |
| 2007/0067088 A1* | 3/2007 | Baig | 701/96 |
| 2007/0104461 A1* | 5/2007 | Cho | 386/96 |
| 2007/0256027 A1* | 11/2007 | Daude | 715/810 |
| 2008/0040685 A1* | 2/2008 | Kolletzki | 715/810 |
| 2008/0059888 A1* | 3/2008 | Dunko | 715/744 |
| 2008/0178118 A1* | 7/2008 | Ishii et al. | 715/810 |
| 2008/0234934 A1* | 9/2008 | Otani | 701/213 |
| 2009/0043448 A1* | 2/2009 | Boger et al. | 701/36 |
| 2009/0284467 A1* | 11/2009 | Itoh et al. | 345/157 |
| 2010/0088632 A1* | 4/2010 | Knowles et al. | 715/784 |

* cited by examiner

|  | Trip Data | |
|---|---|---|
| 12:00 | | |
| Time | Distance | Speed |
| Driving | To next maneuver | Current |
| Stopped | Driven | Average |
| Total Trip | Total | Maximum |
| Back | | Source |

FIG. 40

USER INTERFACE FOR MULTIFUNCTION DEVICE

CROSS-REFERENCE TO RELATED APPLICATIONS

The present application claims the benefit of priority to United States Provisional Patent Application No. 60/839,488, filed Aug. 22, 2006, and to U.S. patent application Ser. No. 11/779,152, filed Jul. 17, 2007, both of which are hereby incorporated by reference.

BACKGROUND OF THE INVENTION

1. Technical Field

The present invention is directed to a user interface for a multifunction device such as, for example, a personal navigation device having navigation and media functionality.

2. Related Art

Until recently, many consumer devices have been designed with a single consumer function in mind. For example, a multimedia player may be designed with particular detail given to its performance of multimedia functions. Similarly, a geographical navigation device, such as a GPS system, may be designed with particular detail given to its performance of geographical navigation functions. In each instance, the user interface may be tailored to the functionality of the particular device. Since the functions of different devices may vary, the user interfaces for the different devices also may significantly differ from one another. Users of multiple consumer devices may find these devices difficult to master since the user may need to learn the nuances of the various user interfaces.

As microelectronic manufacturers develop the ability to integrate more capabilities into ever-decreasing integrated package sizes, consumer device manufacturers have attempted to integrate multiple consumer functions into single consumer devices/systems. Multimedia players and geographical navigation devices, formerly existing as separate entities, may now be incorporated into a single system. However, merely incorporating disparate user interfaces in a single system environment may prove difficult for the end user to comprehend and may impede the ultimate usefulness of the multifunction system.

SUMMARY

A graphical user interface for use in connection with a device having navigation and media functionality includes a navigation interface and a media interface that each have having a plurality of screens adapted to facilitate interaction between a user and a navigation application and a media application, respectively. An application interface toggle button it is actuatable on at least one of the plurality of navigation interface screens and on at least one of the plurality of media interface screens. Actuation of the application interface toggle button from a navigation interface screen invokes display of a media interface screen, and actuation of the application interface toggle button from a media interface screen invokes display of a navigation interface screen.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 40 shows one example of a trip data screen that may be presented to the user upon actuation of the menu button of the map screen shown in FIG. 36.

DETAILED DESCRIPTION OF THE PREFERRED EMBODIMENTS

Figure 1:
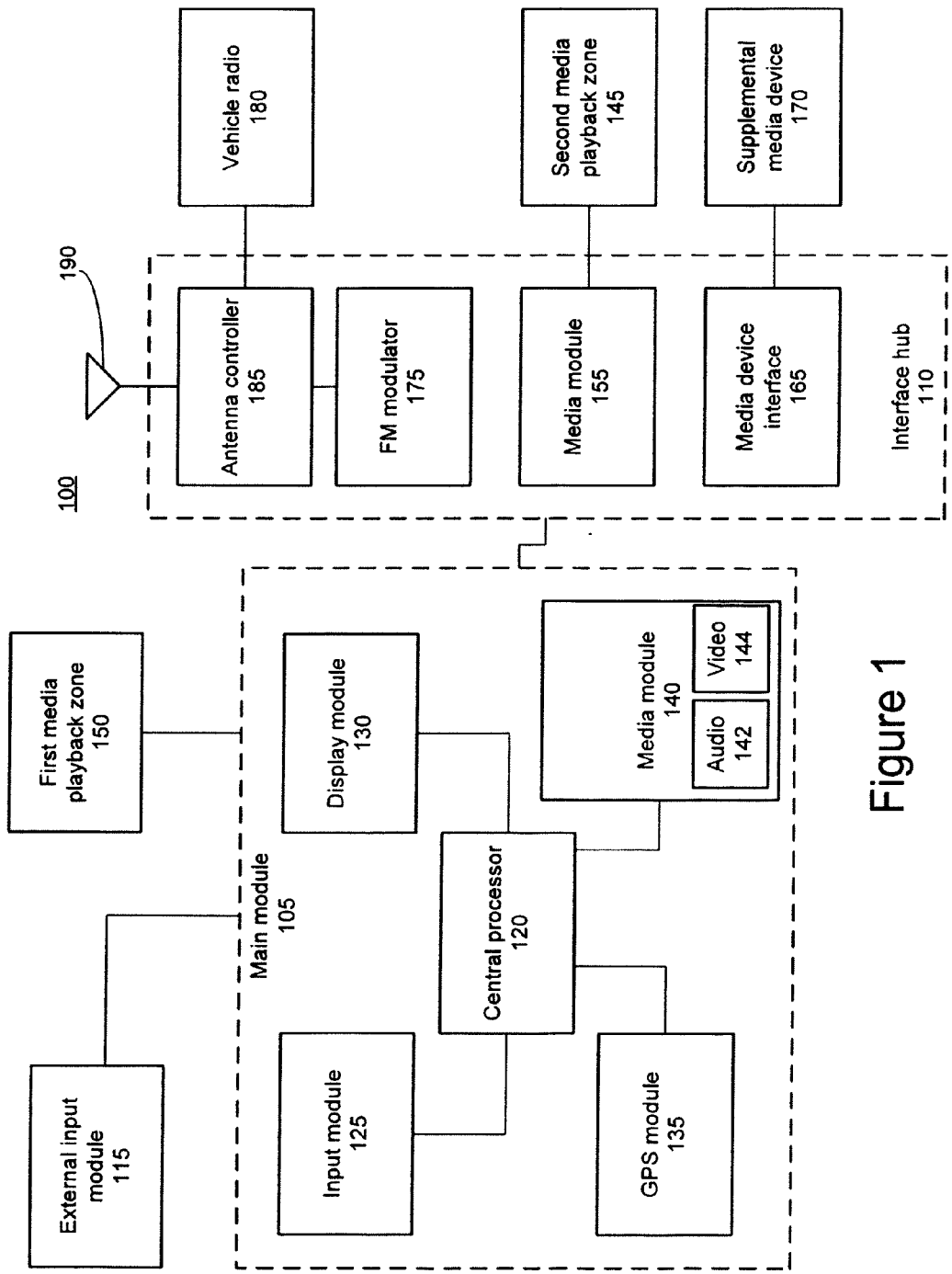
FIG. 1 is a block diagram of one example of a multifunction system that may employ a multifunction user interface.

FIG. 1 is a block diagram of one example of a system 100 that may employ a multifunction user interface. In this example, the system 100 may include geographical navigation functionality as well as media storage and/or playback functionality integrated into a main module 105. System 100 also may include an optional interface hub 110 and an optional external input module 115. Interface hub 110 and external input module 115 provide further system functionality that may be useful when the system 100 is installed in a vehicle.

Main module 105 may be implemented as an assembly that is secured at a fixed location, as an assembly that is readily mounted to and detached from an assembly mount, and/or as a completely portable assembly that is integrated into a single housing without reference to an assembly mount. In each instance, main module 105 may be implemented as a complete system having standalone media and GPS functionality. This functionality may be enhanced when the main module 105 is releasably attached to an assembly mount in a system configuration that includes the interface hub 110 and/or the external input module 115.

It will be recognized that main module 105 may be implemented in a wide variety of manners to execute the user interface described in specific detail below. In the exemplary system shown in FIG. 1, main module 105 may include a central processor 120 that executes programming associated with an input module 125, a display module 130, a GPS module 135, and a media module 140. The circuitry of the central processor 120 may be based on a number of different processor types, such as one or more of the processors available from Centrality® of Redwood City, Calif. The input module 125 and the display module 130 facilitate user interaction with other portions of the main module 105 by allowing, for example, the user to select menu entries, input data, and the like, in response to menus, prompts, data fields, and the like provided on a display of the display module 130. Some such menus, prompts, data field identification, and the like also may be provided audibly using, for example, the media module 140. The input module 125 may include push-button switches, touchscreen areas on a touchscreen of display module 130, or a combination of both. The use of a touchscreen display to implement both the input module 125 and display module 130 assists in rendering the main module 105 compact and portable and, further, may contribute to the ability of the end-user to master the functions provided by the main module 105.

The GPS module 135 may include those components that are used to implement the various functions associated with a geographical navigation device. Such functions may include: 1) ascertaining a geographical destination and/or location by address, intersection, place name, or place type; 2) guiding the user to a defined destination; 3) simulating a trip from first location to second location; and/or 4) finding information in the context of a given location. The specific allocation of the resources of the main module 105 used to implement the geographical navigation functions are not particularly pertinent to the overall operation of the system 100. As such, a majority of the geographical navigation functions may be implemented by the central processor 120, by the GPS module 135, or divided between them in an equal or unequal manner. Additionally, many of the functions associated with the geographical navigation operations associated with main module 105 may be implemented by the input module 125 and/or display module 130.

The media module 140 may include components that are used to implement the various functions associated with a media device. Such functions may include: 1) providing internal storage for media (audio and/or video); 2) providing access to removable and/or external storage for media; 3) locating media on storage for playback; and/or 4) controlling media playback. The media module 140 may include an audio module 142 for storage, playback, and/or control of audio media, such as music, and a video module 144 for storage, playback, and/or control of video media. The media module 140 may playback audio media through self-contained speaker and/or headphone circuitry. In the illustrated example, main module 105 may provide audio and/or video output to a first playback zone 150, which may be integrated into the main module 105 or formed as a separate component. Similarly, media module 140 may playback video media on display module 130. Still further, media module 140 may playback video media provided from an external source, such as a DVD player, iPod®, or the like.

As with the geographical navigation functions, the specific allocation of the resources of the main module 105 used to implement the media functions are not particularly pertinent to the overall operation of the system 100. As such, a majority of the media functions may be implemented by the central processor 120, by the media module 140, or divided between them in an equal or unequal manner. Additionally, functions associated with the media operations of the main module 105 may be implemented by the input module 125 and/or display module 130.

Interface hub 110 may include components that extend the functionality of the main module 105. For example, interface hub 110 may include a further media module 155. The further media module 155 may provide additional media storage space and playback video and/or audio through a second media zone 160 under the control of the main module 105. A media device interface 165 may be provided in the interface hub 110 to facilitate use of one or more supplemental media devices 170 with the main module 105. Such supplemental media devices 170 may include, for example, MP3 players, iPod® devices, satellite radios, and the like. An FM modulator 175 also may be included in the interface hub 110 to modulate any of the audio signals of system 100 to an RF frequency suitable for reception by the radio 180 of the vehicle. If desired, the output of the FM modulator 175 may be filtered through an antenna controller 185 to limit undesirable retransmission of the modulated signal over antenna 190.

When configured for installation in a vehicle, external input module 115 may be mountable at a first location within the vehicle cabin for manipulation by the user. The main module 105 may be securely mounted or removably docked at a second location within the vehicle cabin. For example, the external input module 115 may be mounted on a console between the driver's seat and the front passenger seat of the vehicle, while the main module 105 may be mounted in or on the dashboard of the vehicle. This allows the user to manipulate the external input module 115 and observe the display of the main module 105 with a minimal amount of distraction. Although the interconnections between the external input module 115 and of the main module 105 may be wired connections, such connections may be replaced by one or more wireless connections, such as infrared connections, Bluetooth connections, etc. In operation, both the external input module 115 and input module 125 may be concurrently active to facilitate user input from either.

Figure 2:
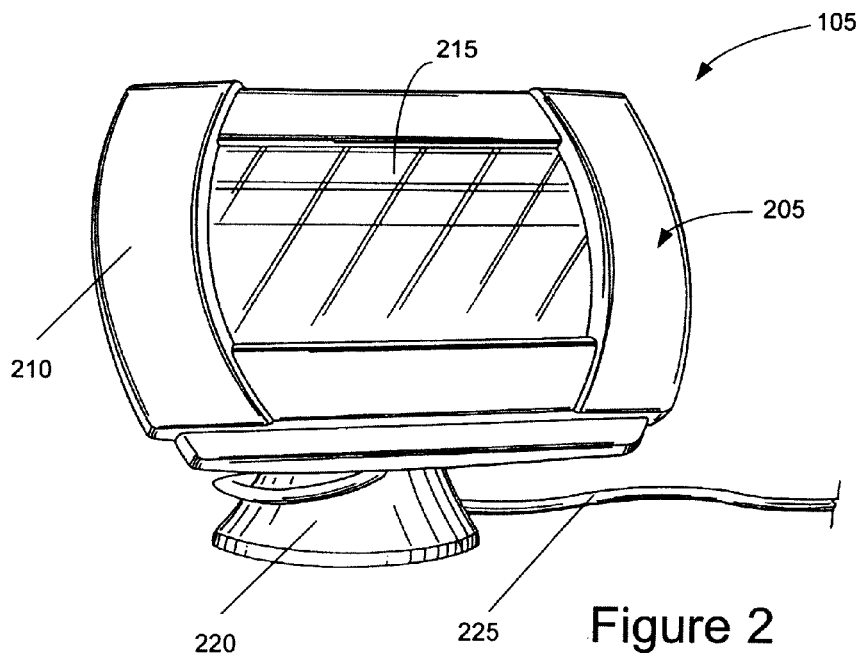
FIG. 2 is a perspective view of one manner in which the main module shown in FIG. 1 may be physically implemented.

FIG. 2 is a perspective view of one manner in which the main module 105 shown in FIG. 1 may be physically implemented. In this example, main module 105 includes a housing 205 having a front portion with an opening defined by a bezel 210. Bezel 210 is disposed about the periphery of an electronic display 215, such as a touchscreen display. A mounting stem 220 may extend to engage housing 205 to facilitate mounting of the main module 105 within the vehicle cabin. Depending on the desired implementation, main module 105 and mounting stem 220 may include cooperating connectors to facilitate connection of electrical signals between the main module 105 and other components of the system 100, such as, for example, interface hub 110, external input module 115, components of the first media playback zone 150, and the like. One or more cables 225 proceed from the housing 205 for connection to such other system components.

Figure 3:
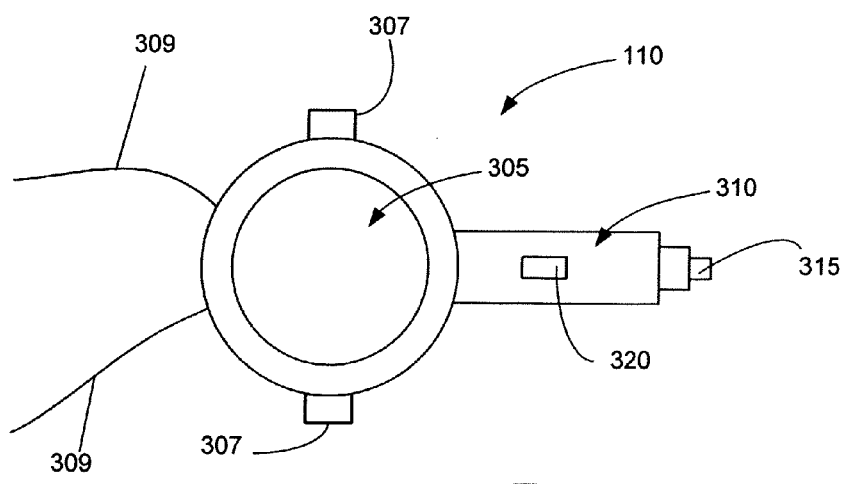
FIG. 3 is a top plan view of one manner in which the interface hub shown in FIG. 1 may be physically implemented.

FIG. 3 is a top plan view of one manner in which the interface hub 110 shown in FIG. 1 may be physically implemented. In this example, the interface hub 110 includes a body portion 305 that may enclose the electronics of the interface hub 110. Mounting tabs 307 may extend from the body portion and may be used to mount the interface hub at a fixed location in the vehicle. One or more conductive lines 309 may be provided to connect the interface hub 110 to other components of the system 100.

A power stalk 310 having positive and negative power terminals 315 and 320 extends from the body portion 305 and may be used to engage a corresponding power opening, such as a cigarette lighter opening of the vehicle. The power received through stalk 310 may be used to power the electronics of the interface hub 110, main module 105, and external input module 115. If the main module 105 is powered with a rechargeable battery, the power provided through stalk 310 also may be used for recharging purposes. Stalk 310 and body portion 305 may be constructed so that the stalk 310 is removable to allow the user to optionally secure the interface hub 110 at a fixed location using the mounting tabs 307. Otherwise, the interface hub 110 may be supported by the stalk 310 when the stalk 310 is inserted into the corresponding power opening.

Figure 4:
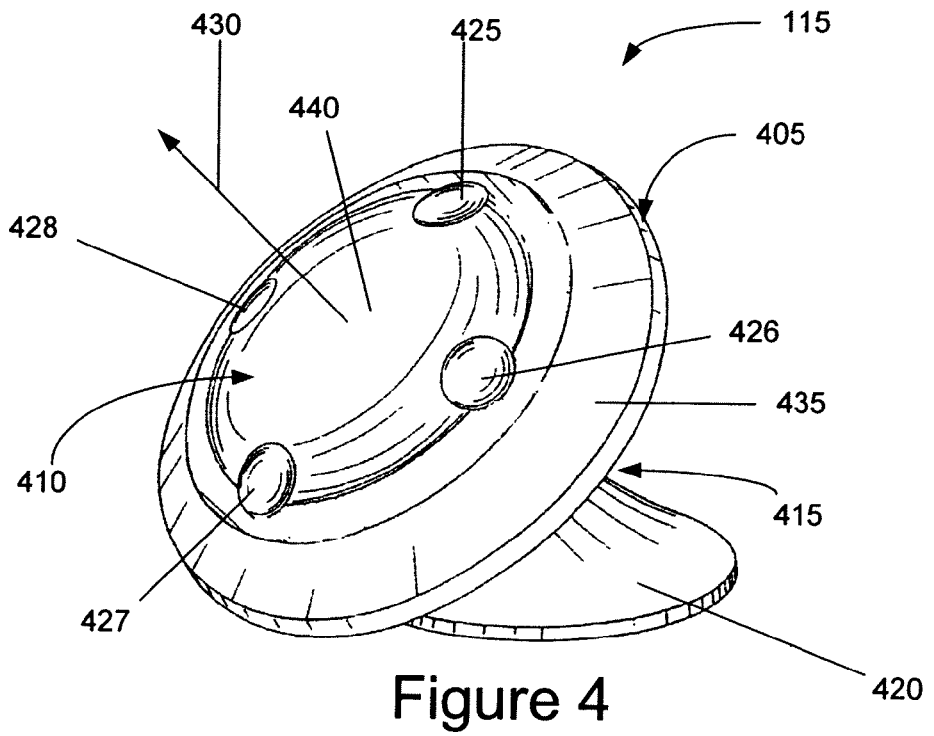
FIG. 4 is a perspective view of the external input module shown in FIG. 1.

FIG. 4 is a perspective view of the external input module 115 shown in FIG. 1. As illustrated, the external input module 115 is in the form of a generally circular housing 405 having a face portion 410 and a rear portion 415. A mounting stem 420 extends from the rear portion 415 of the housing 405 to facilitate mounting of the external input module 115 in the vehicle cabin.

The external input module 115 includes a number of components that allow a user to interact with system 100. In the illustrated example, the external input module 115 may include a plurality of user selectable buttons 425, 426, 427, and 428, are disposed radially about a first axis 430 of the generally circular housing 405. A potentiometer control 435 also may be provided. Potentiometer control 435 may be disposed for rotational movement about an axis of the housing 405, such as axis 430, although other relative orientations for the potentiometer control 435 may be employed. A central select button 440 may be disposed proximate a central area of the front portion 410.

Potentiometer control 435 may be rotated about axis 430 in a clockwise direction and/or counterclockwise direction. The rotation of the potentiometer control 435 may be continuous in each direction. Alternatively, the potentiometer control 435 may have limited rotational motion in each direction. The output of the potentiometer control 435 may be provided to the input of an analog-to-digital converter, where the digital value corresponds to the position of the potentiometer control 435 and the rate of change of the digital value indicates how quickly the user rotates the control 435.

Figure 5:
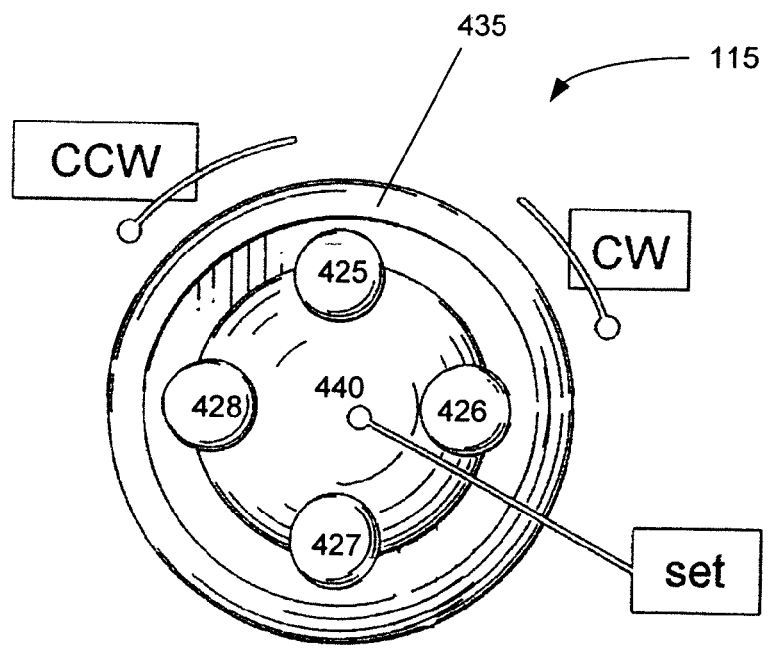
FIG. 5 is a plan view of the external input module shown in FIG. 4.
Figure 6:
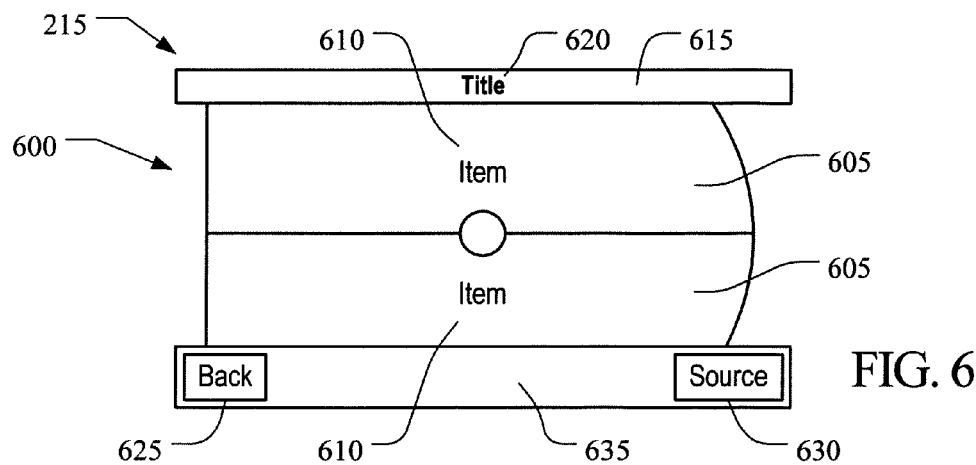
FIGS. 6 through 12 are directed to exemplary screen layouts that may be used to implement various user interfaces that are employed to interact with the underlying functional applications executed by the main module of the system shown in FIG. 1.
Figure 7:
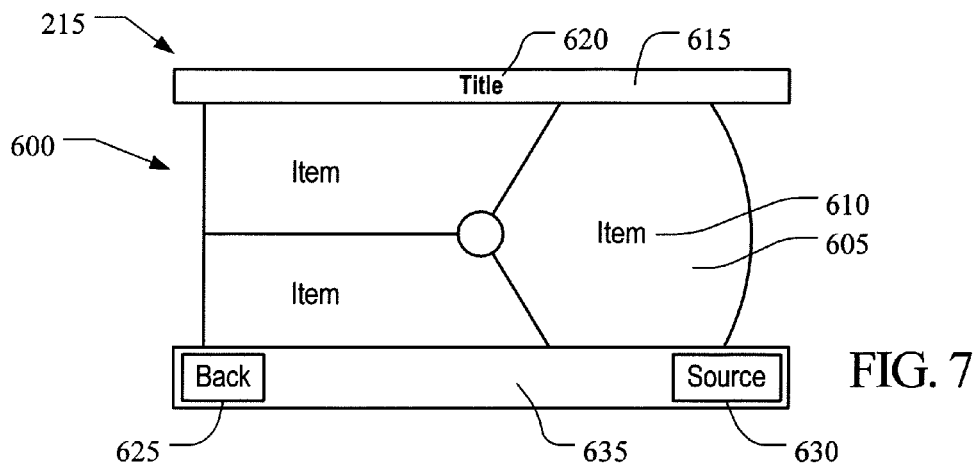
Figure 8:
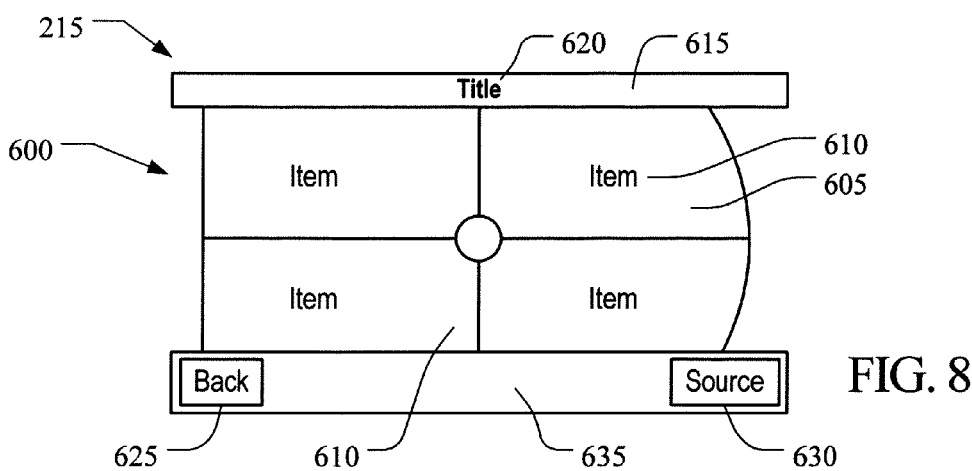
Figure 9:
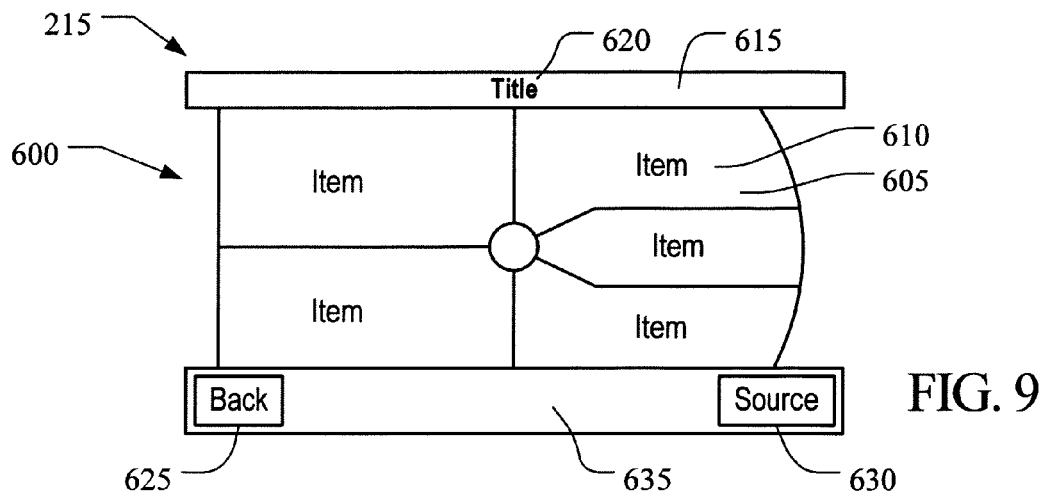
Figure 10:
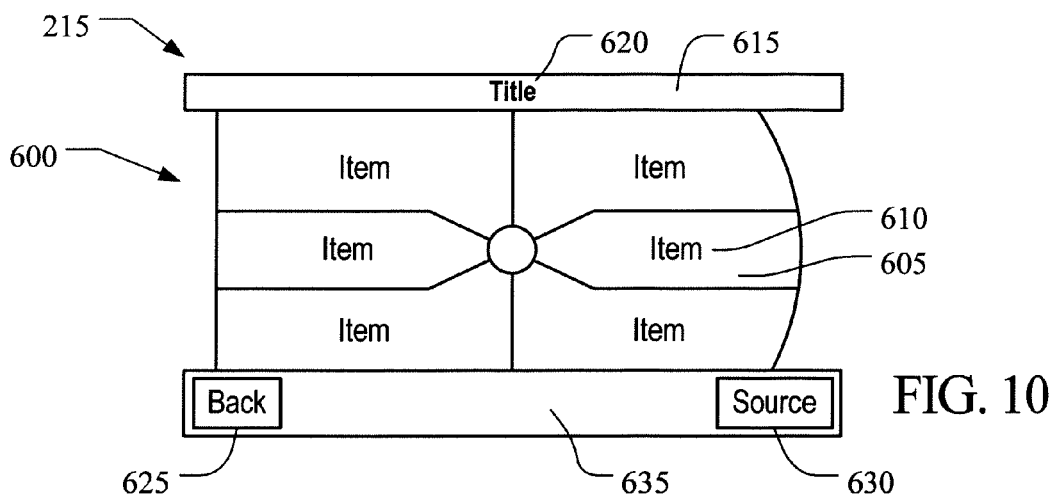
Figure 11:
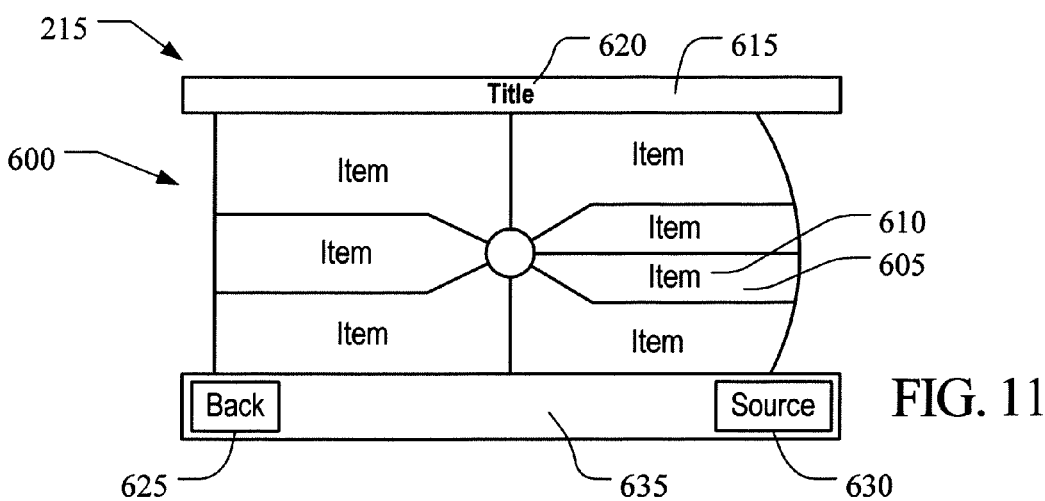
Figure 12:
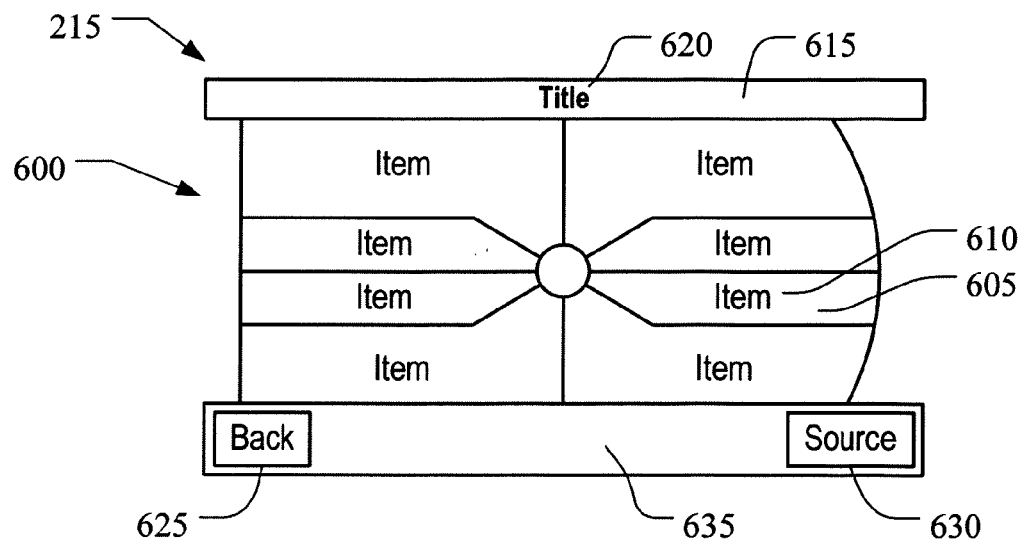

FIG. 5 is a plan view of the external input module 115 shown in FIG. 4. The function(s) executed by a particular button will often depend on the context in which it is activated, such as the state of system 100 at the time of activation. Each of the buttons 425, 426, 427, and 428 may have a primary function, a secondary function, a tertiary function, and the like. Further, these functions may vary depending on which interface is provided by the main module 105 to the user at a given time. For example, buttons 426 and 428 may be used as track selection buttons when the main module 105 provides the user with a screen from the audio media interface. Alternatively, or in addition, rotation of the potentiometer control 435 may be used to scroll through a list of audio media, with activation of the switch 440 providing selection of an audio media file from the displayed list.

There are a variety of manners in which activation of the various switches and potentiometer control may be detected in system 100. In one example, the central processor 120 may be responsive to interrupts that are generated when the buttons are pressed and/or the potentiometer control is rotated. Which button has been pressed may be determined by checking the buttons upon occurrence of the interrupt and storing data corresponding to the interrupt for handling. Polling of the buttons and control potentiometer also may be employed.

The user interface used by system 100 to facilitate interaction between the user and the application functions may be presented in a number of different manners. For example, the user interface described below may employ four types of screens: menu screens, wizard screens, information screens, and action screens. Menu screens may be used to provide pathways to data input wizard applications and to informational screens. Wizard screens may be used to provide data entry and pair down database search results. Information screens may be used to provide non-interactive information to the user, and action screens may be used to provide interactive information and entertainment.

FIGS. 6 through 12 are directed to exemplary screen layouts 600 that may be used to implement various user interfaces that are employed to interact with the underlying functional applications executed by the main module 105. In these examples, each screen layout 600 is comprised of a plurality of buttons 605 and corresponding visual indicia 610, such as alphanumeric characters, that may be used to identify the function(s) associated with each button 605. The buttons 605 may be selected virtually, as with a pointing/selection device, or directly as with a touchscreen. Selection also may be accomplished using voice activation in systems provided with voice recognition capabilities. The buttons 605 may be disposed about the area of the screen 215 in a variety of different manners. For example, the buttons 605 of the illustrated screen layouts 600 shown in FIGS. 6 through 12 have been selectively disposed about the screen 215 in a radial fashion to correspond to the radial nature of the specific construction of the external input module 115 shown in FIG. 5.

Other buttons also may be provided on the screen layouts 600. For example, each screen layout 600 may include a title section 615. Visual indicia 620, such as alphanumeric characters, may be provided in the title section 615 to indicate the current operational context of the buttons 605. A back button 625 may be provided for activation by the user to direct the user interface software to display a prior screen layout. Additionally, a source button 630 may be used to invoke display of a source menu. Although the source button 630 in each of the examples set forth below is presented as a touchscreen button, it also may be provided as a hardware button that is manually actuated by the user apart from the screen. A source menu button 630 may be presented on a plurality of the screens of the navigation interface and media interface to provide ready access to the corresponding source menu (discussed below).

Still further, the operational context of an underlying user interface may be identified in a region such as 635 disposed between the back button 625 and source button 630. Region 635 may be used as an interface toggle button to direct the user interface software to store the operational context of the currently displayed user interface and switch to the display of the current and/or stored operational context of the underlying user interface. Using region 635 as a button thereby allows the user to switch between user interfaces corresponding to different device functions. For example, activation of button 635 may be employed by the user to toggle between a screen layout of the navigation user interface and a screen layout of the media user interface.

Figure 13:
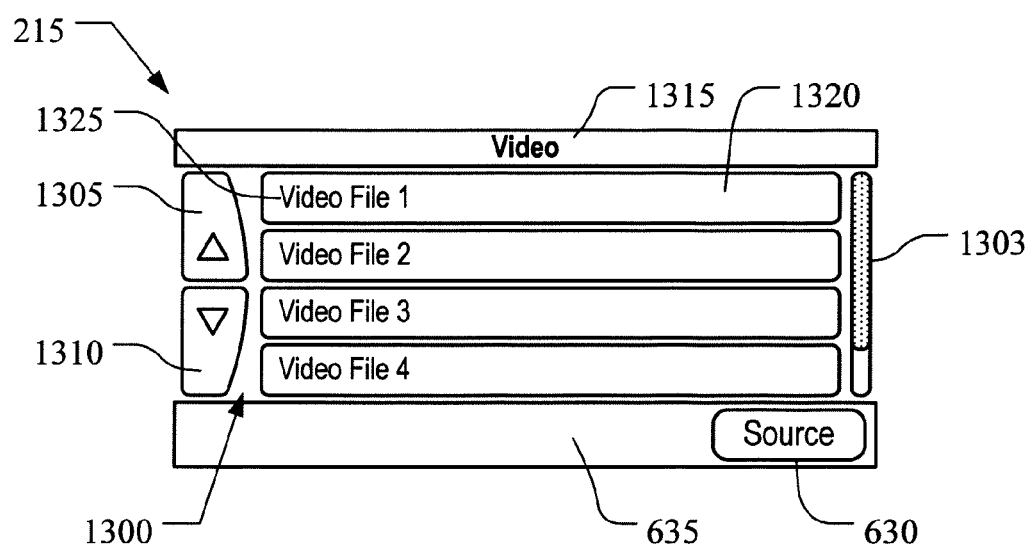
FIG. 13 illustrates a screen layout that also may be used in connection with one or more portions of the user interface of the system shown in FIG. 1.

FIG. 13 illustrates a screen layout 1300 that also may be used in connection with one or more portions of the user interface of system 100. The screen layout 1300 is particularly suitable for use in displaying and/or selecting database driven results. It is also suitable for use in those instances in which concurrent display of all available information and/or menu selections tends to crowd the screen 215. In certain instances, the system 100 may display alphabetically or numerically organized search results in the manner shown in FIG. 13. The up and down arrows 1305 and 1310 on the side of the menu screen 1300 may be used to page up and page down through multiple menu items and/or through multiple pages of information. If a selected item is highlighted and the user pages up or down, the first item of the newly drawn page may be highlighted. A scroll indicator 1303 may be used to indicate where the currently displayed page is relative to the entire list of menu items.

In the example shown in FIG. 13, the screen layout 1300 is adapted to implement a video list screen. The fact that the screen layout 1300 is associated with selection of a video file is indicated by the word "video" in the title section 1315 of the screen layout 1300. A plurality of buttons 1320 are provided for user selection of a particular video file. Visual indicia 1325, such as alphanumeric characters, may be used to identify the video file associated with a particular button 1320. As above, the screen layout 1300 may be provided with a source button 630. Further, region 635 may be used as a button to allow the user to switch between user interfaces that correspond to different device functions.

Figure 14:
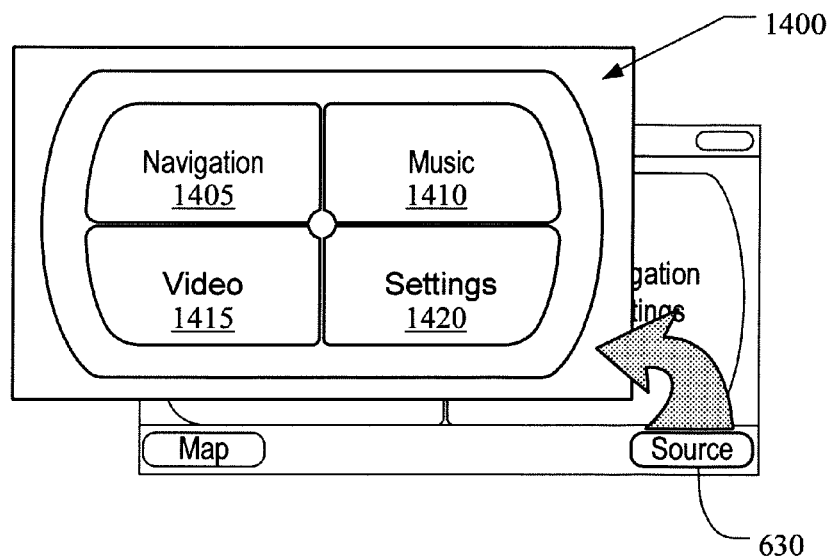
FIG. 14 illustrates one manner in which a source menu may be laid out.

FIG. 14 illustrates one manner in which the source menu 1400 may be laid out. Source menu 1400 may be implemented as a pop-up display that sits atop any current screen when the source button 630 is activated. From the source menu 1400, the user may access the user interfaces associated with the various applications executed by the system 100. In the illustrated example, the source menu 1400 allows the user to access interfaces associated with three applications as well as an interface associated with setting the user selectable options. To this end, the source menu 1400 includes a navigation button 1405, a music button 1410, a video button 1415, and a settings button 1420.

The user interfaces associated with each of the primary sections (Navigation, Audio, Video, Settings) may have consistent colored outer glows and button down states. For example, the navigation section may be blue, the audio section may be red, the video section may be green, and the settings section may be gray. These colors may correspond to the colors used to invoke the respective interface on the source menu 1400.

The specific screen layout that is displayed upon activation of one of the buttons 1405, 1410, 1415, or 1420, may be dependent on the prior saved state of the application associated with the button. When a button is actuated for the first time or when a prior saved state does not exist for the selected application, then activation of one of the buttons may result in the display of a top/main menu associated with the selected application. These top/main menus may include: Navigation—no active route; Navigation—with active route; Audio—with media present; Audio—no media is present; Video; and Settings.

Figure 15:
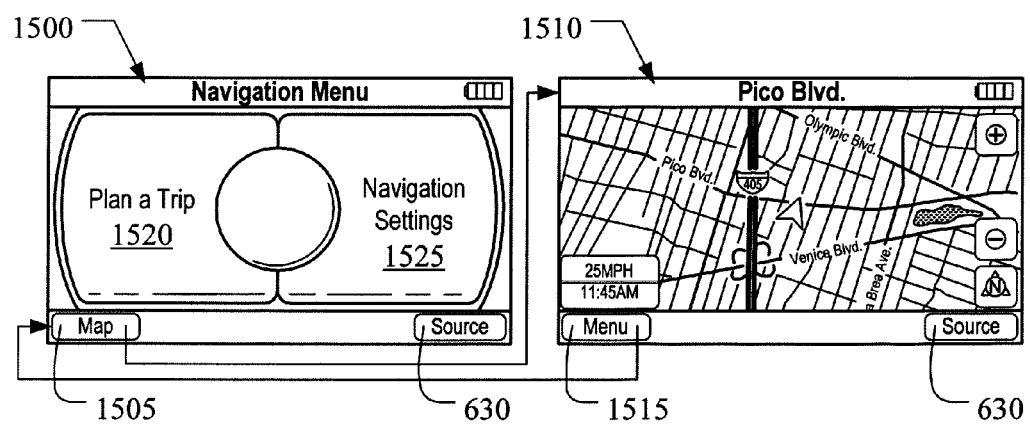
FIG. 15 shows exemplary screen layouts that may provide user interaction with the navigation application when the user activates the navigation button of the source menu shown in FIG. 14.

Navigation—No active route—FIG. 15 shows exemplary screen layouts that may be provided to interact with the navigation application on screen 215 when the user activates the navigation button 1405, but no active route has been programmed into the navigation application. Under such circumstances, a 2-item navigation menu 1500 may be displayed. The navigation menu 1500 may include a "map" button 1505 that may be used to switch between this 2-item screen 1500 and a map screen 1510 that indicates the current position of the system 100 as calculated by the navigation application. A "menu" or "back" button 1515 may be used to switch back from the map screen 1510 to the navigation menu screen 1500.

Figure 16:
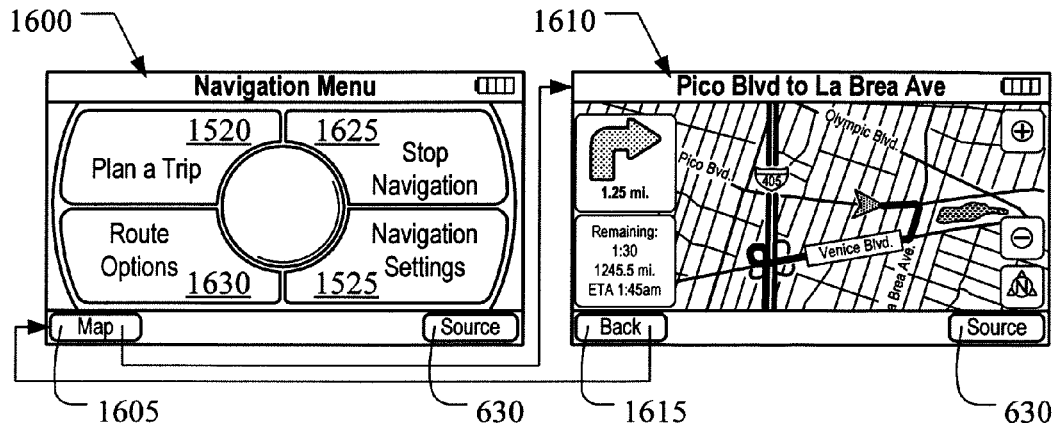
FIG. 16 shows exemplary screen layouts that may provide user interaction with the navigation application when the user activates the navigation button of the source menu shown in FIG. 14 while the navigation application is engaged in activities associated with an active route.

Navigation—With active route—FIG. 16 shows exemplary screen layouts that may be provided to interact with the navigation application on screen 215 when the user activates the navigation button 1405 while the navigation application is engaged in activities associated with an active route. Under such circumstances, a 4-item navigation menu 1600 may be displayed. The navigation menu 1600 may include a "map" button 1605 that may be used to switch between this 4-item screen 1600 and a map screen 1610. The map screen 1610 may be used to display routing information provided by of the navigation application. A "menu" or "back" button 1615 may be used to switch back from the map screen 1610 to the navigation menu screen 1600.

Figure 17:
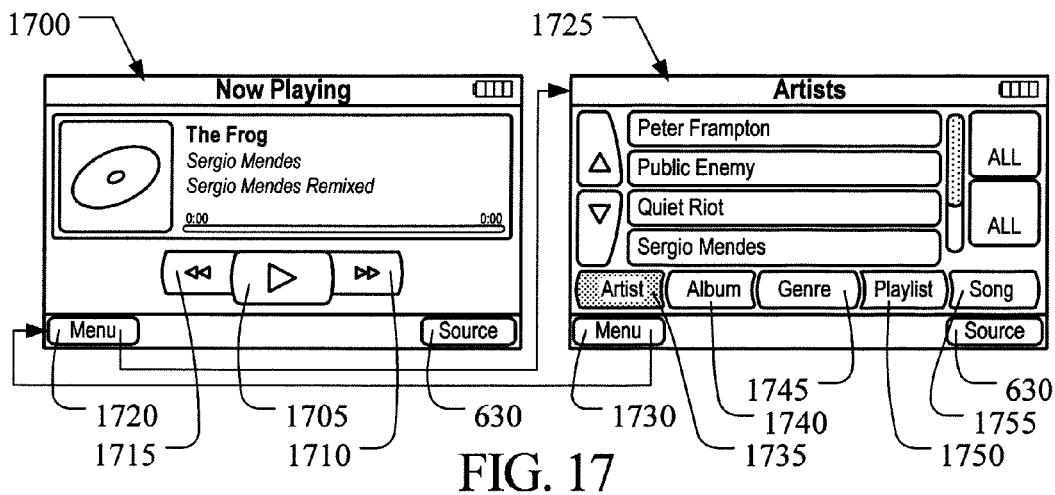
FIG. 17 shows exemplary screen layouts that may provide user interaction with a media application when the user activates the music button of the source menu shown in FIG. 14 while the media application is engaged in activities associated with playback of an audio file.

Audio—with media present—FIG. 17 shows exemplary screen layouts that may be provided to interact with a media application on screen 215 when the user activates the music button 1410 while the media application is engaged in activities associated with playback of an audio file. Under such circumstances, a playback control screen 1700 may be displayed that identifies the audio file currently playing. The playback control screen 1700 may include a play/pause button 1705, a fast forward/next track button 1710, and a rewind/previous track button 1715. Additionally, the playback control screen 1700 may include a "menu" button 1720 or the like that may be used to switch between the playback control screen 1700 and an audio locator screen 1725. The audio locator screen 1725 may be used to locate audio media by, for example, artist, album, genre, playlist, and/or song name. Such location information may be provided using the media application. A "menu" or "back" button 1730 may be used to switch back from the audio locator menu screen 1725 to the playback control screen 1700.

Figure 18:
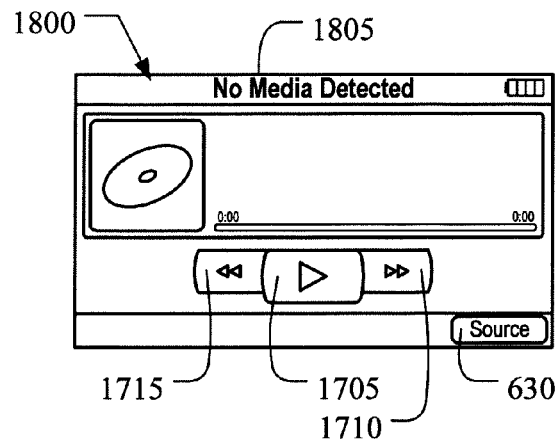
FIG. 18 shows an exemplary menu screen that may provide user interaction with the media application when the user activates the music button of the source menu shown in FIG. 14 and where the media application fails to detect an audio file on the system.

Audio—no media present—FIG. 18 shows an exemplary menu screen that may be provided on screen 215 to interact with the media application when the user activates the music button 1410 and where the media application fails to detect an audio file on system 100. Under such circumstances, a no media detected screen 1800 may be displayed that uses information in the title bar 1805 to indicate the absence of audio media files. To maintain a consistent look, screen layout 1800 may maintain the play/pause button 1705, the fast forward/next track button 1710, and the rewind/previous track button 1715 found on the playback control screen 1700.

Figure 19:
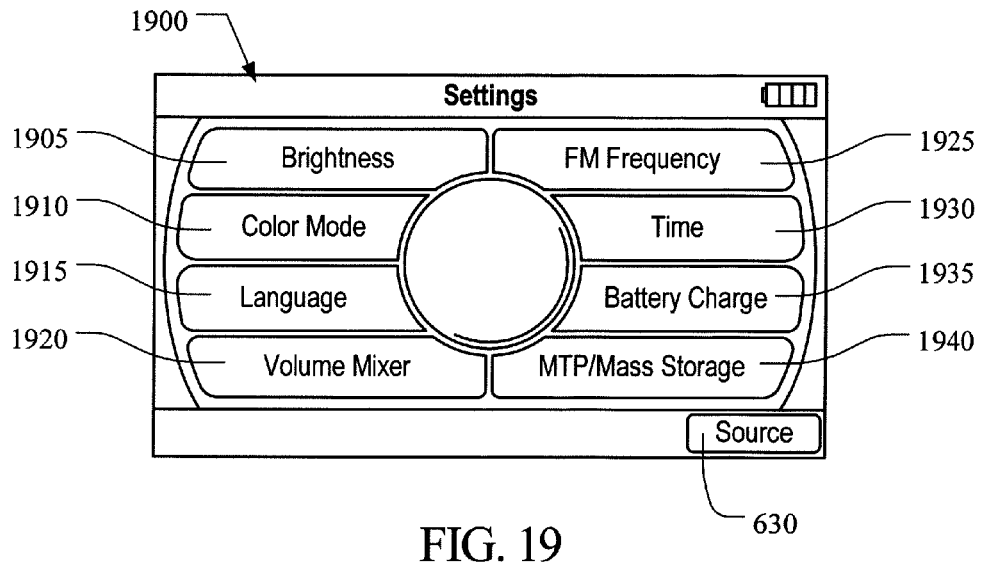
FIG. 19 shows an exemplary screen layout that may be provided when the user activates the settings button of the source menu shown in FIG. 14.

FIG. 19 shows an exemplary screen layout that may be provided on screen 215 when the user activates the settings button 1420 of the source menu 1400. In this example, the activation of the settings button 1420 directs system 100 to present the user with a main settings menu 1900 through which the user may interact with a settings application. The main settings menu 1900 may provide a plurality of buttons that may be activated to access system options that may be set and/or changed by the user. For example, the plurality of buttons may include a button 1905 to access brightness settings, a button 1910 to access color mode settings, a button 1915 to access language, a button 1920 to access volume mixer settings, a button 1925 to access FM broadcast settings associated with FM modulator 175, a button 1930 to access date/time settings, a button 1935 to access battery charge settings, and a button 1940 to access MTP/mass storage settings.

Figure 20:
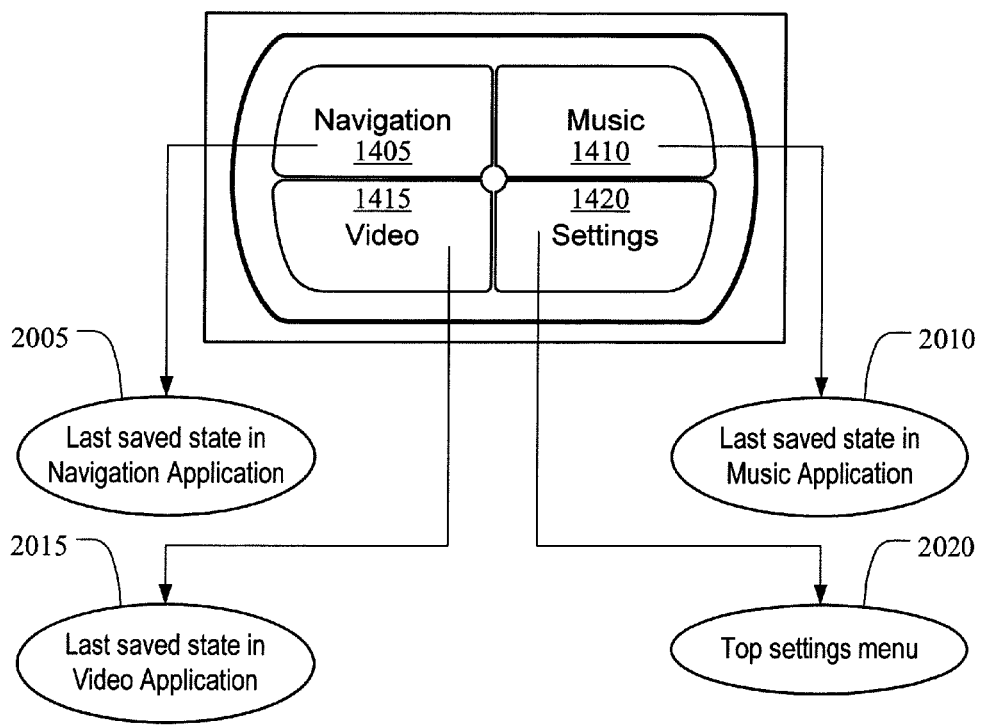
FIG. 20 illustrates how the navigation button, music button, and video button return the user to the last saved state in the navigation application, music application, and video application, respectively, when the buttons are actuated by the user.

As shown in FIG. 20, the navigation, audio, and video sections may maintain state when the user switches applications. The last screen the user views when leaving a particular application is preferably the first screen the user views when returning to that application.

When the source button 630 is actuated from any of the screen layouts, the state of the current active screen layout and, if desired, the specific state of the currently active application may be saved. The current active screen layout and, if desired, specific state of the currently active application are therefore available for subsequent access. Such subsequent access may include any changes made to the state of the currently active application and/or current active screen layout that logically occurs over time as a result of the logical operation of the respective application.

The source menu 1400 with its corresponding menu selection buttons 1405, 1410, 1415, and 1420, is also displayed to the user. As shown in FIG. 20, user activation of the navigation button 1405 directs the navigation interface at 2005 to display a screen layout corresponding to the last saved screen layout of the last saved state of the navigation application. If no such prior saved screen/state exists, the navigation interface may display the default screen menu 1500 shown in FIG. 15. User activation of the music button 1410 directs the audio media interface at 2010 to display a screen layout corresponding to the last saved screen layout of the last saved state of the audio media application. If no such prior saved screen/state exists, the audio media interface may display the default screen menus shown in FIG. 17 or 18. User activation of the video button 1415 directs the video media interface at 2015 to display a screen layout corresponding to the last saved screen layout of the last saved state of the video media application. If no such prior saved screen/state exists, the video media interface may display one or more default screen menus similar to those shown in FIG. 17 or 18.

User activation of the settings button 1420 may function slightly different than activation of buttons 1405, 1410, and 1415. Since the settings application is not likely to be used on a frequent basis, user activation of the settings button 1420 may direct the settings interface at 2020 to display a screen layout corresponding to the top settings menu, such as shown at 1900 of FIG. 19, as opposed to the last saved screen layout of the last saved state of the settings application. If desired, however, activation of the settings button 1420 may direct the settings application to display a screen layout corresponding to the last saved screen layout of the last saved state of the settings application.

As shown in FIG. 15, a user may be presented with navigation menu 1500 when the navigation button 1405 is activated. In the example illustrated in FIG. 15, the navigation menu 1500 includes a "plan a trip" button 1520 and a "navigation settings" button 1525. If the system 100 is currently engaged in a navigating activity, the navigation menu 1600 shown in FIG. 16 may be employed. The navigation menu 1600 may include an additional stop navigation button 1525 and a route options button 1630.

Figure 21:
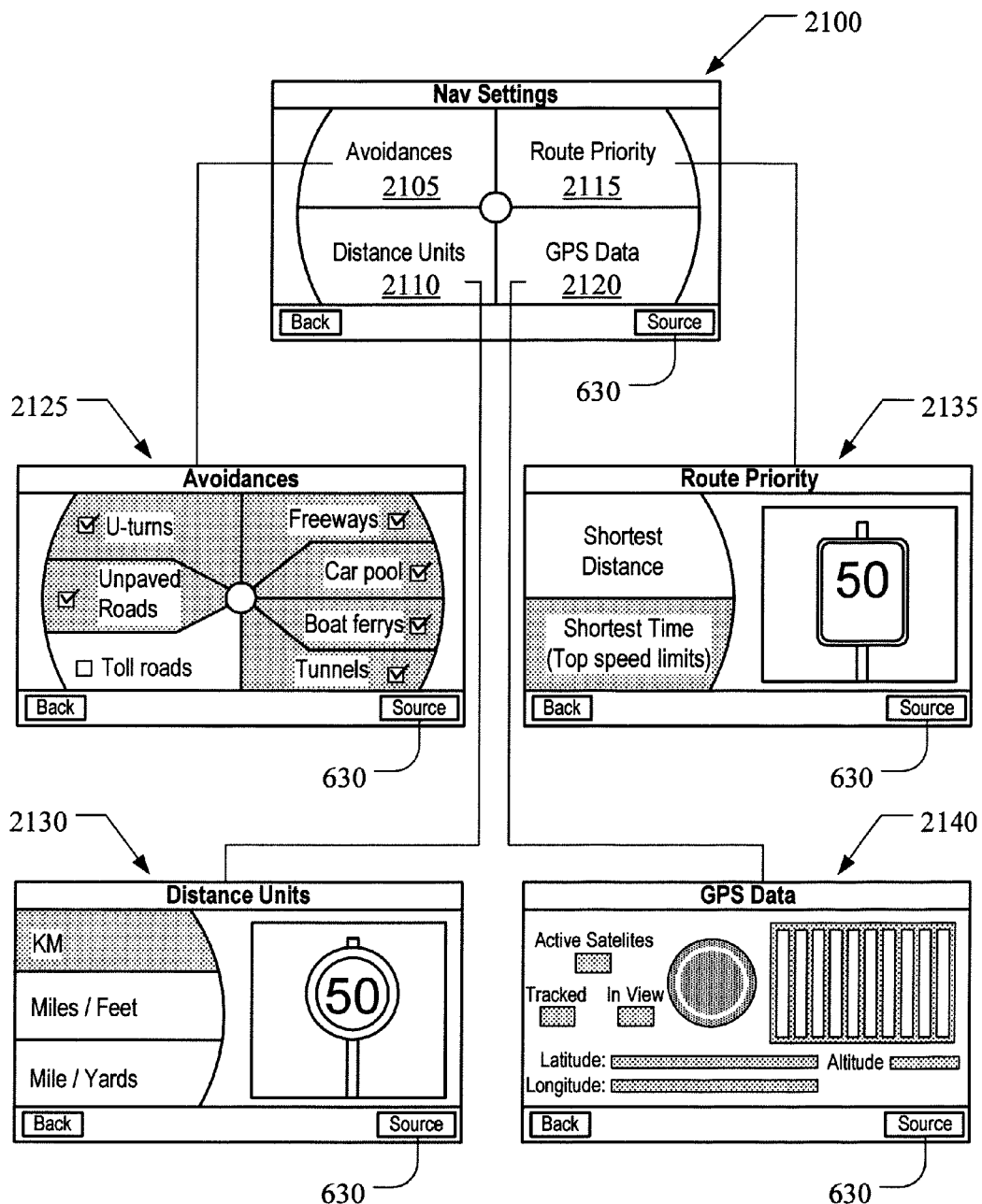
FIG. 21 shows a plurality of screens that may be employed in connection with the navigation application when the navigation settings button of the source menu shown in FIG. 14 is actuated by the user.

FIG. 21 shows a plurality of screens that may be employed in connection with the navigation application when the navigation settings button 1525 is actuated by the user. The plurality of screens may be used to allow the user to view and calculate default navigation settings. Which settings are to be viewed and/or altered may be selected from a top level navigation settings interface screen 2100. These settings may include, for example, items to avoid (avoidances) 2105, distance units 2110 that are to be used by the navigation application, route priority options 2115 that are to be used by the navigation application, and GPS status data 2120 received from the navigation application. Navigation interface screens for avoidances 2125, distance unit selection 2130, route priority option selection 2135, and GPS status data display 2140 are shown in FIG. 21 with corresponding links to the activating button of the navigation settings interface screen 2100. Each of the screens, or a subset thereof, may be provided with a source button 630 for access to the source menu 1400.

Figure 22:
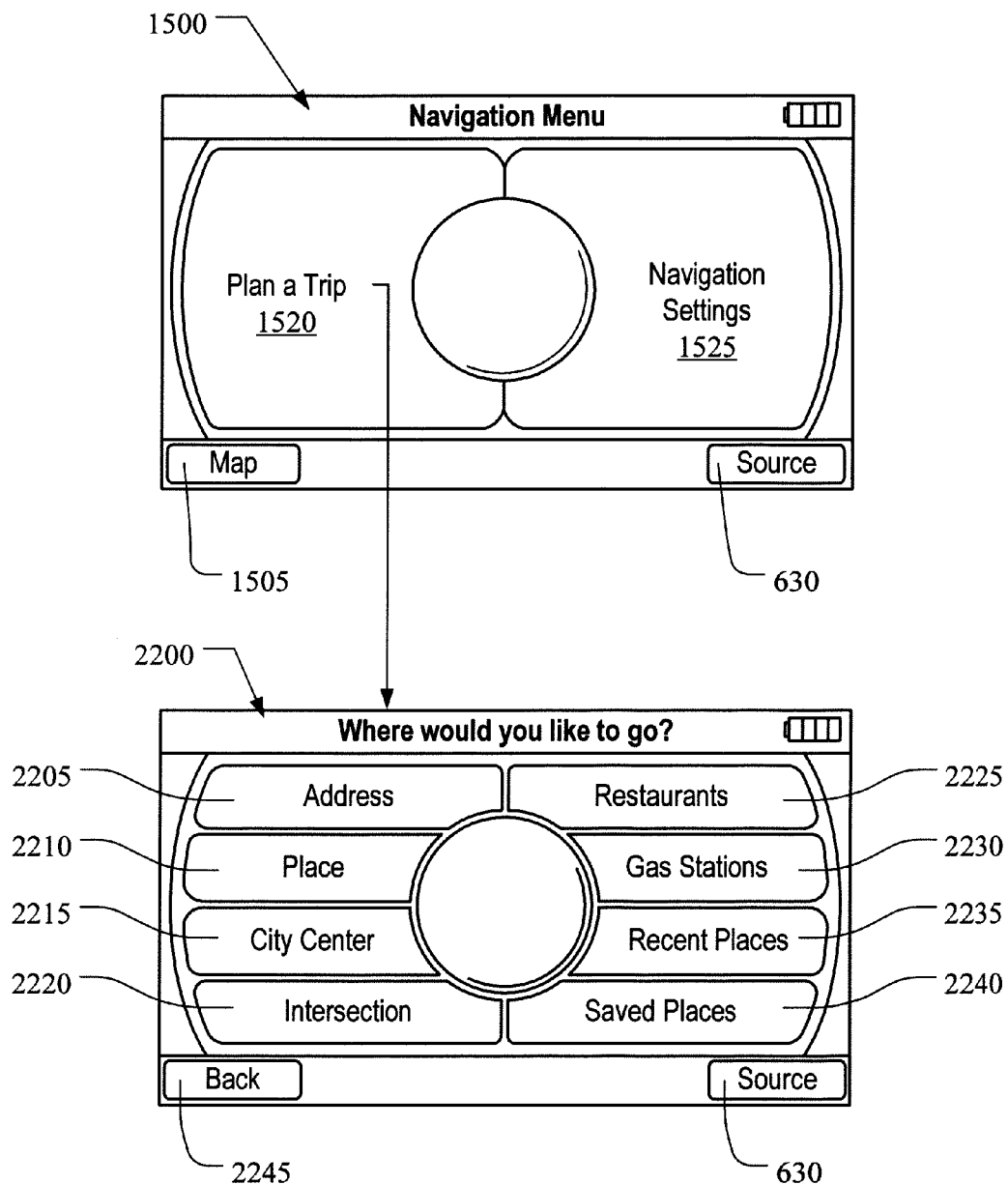
FIG. 22 illustrates a place selection menu that may be provided to a user upon activation of the "plan a trip" button of the navigation menu shown in FIG. 15.

FIG. 22 illustrates a place selection menu 2200 that may be provided to a user upon activation of the "plan a trip" button 1520 of the navigation menu 1500. The place selection menu 2200 allows the user to indicate the manner in which a route and/or destination is to be provided to the navigation application. To this end, the place selection menu 2200 may include an address button 2205 that may be used to initiate the display of one or more subsequent screens that the user can use to define a destination by its address, zip code, and/or city. The user also may initiate the display of one or more screens used to search for a destination by place name or place type using buttons 2210, 2225, and/or 2230. Still further, the user may initiate the display of one or more screens used to recall an address from a list of recently input destinations or an address book using buttons 2235 and 2240, respectively. The display of one or more screens used to set a city center or intersection as the destination may be initiated through activation of buttons 2215 and 2220, respectively.

Figure 23:
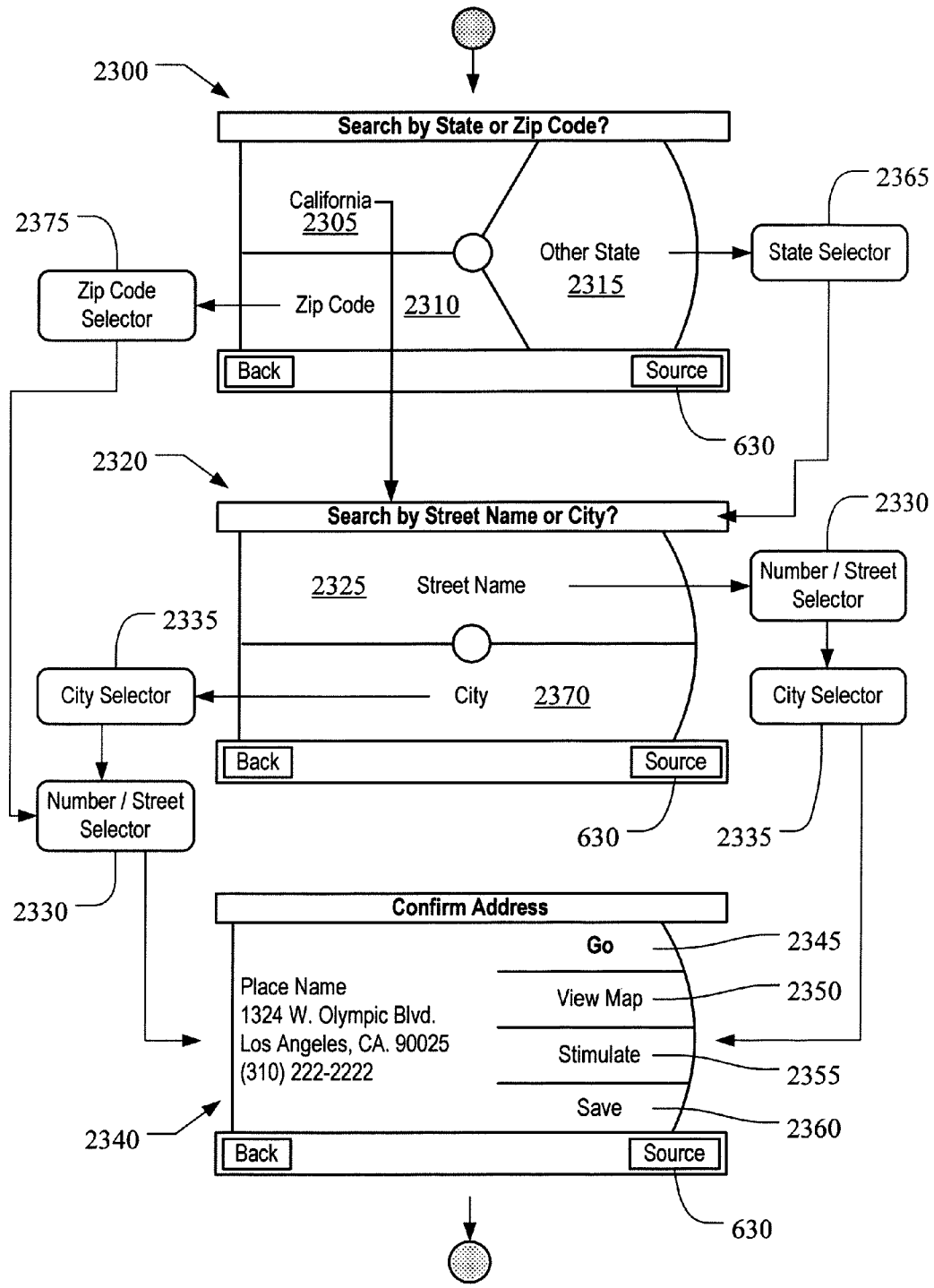
FIG. 23 is a flow diagram illustrating one manner in which the navigation interface may operate in response to user activation of the address button shown in FIG. 22.

FIG. 23 is a flow diagram illustrating one manner in which the navigation interface may operate in response to user activation of the address button 2205 shown in FIG. 22. In this example, address definition for the destination may be executed by presenting a series of navigation screens having multiple choice questions and/or prompts that narrow down possible destinations. To this end, the user may be presented with the state/zip code search options menu 2300 when the address button 2205 is actuated. The exemplary state/ZIP code search options menu 2300 includes a default state selection button 2305, a ZIP code option button 2310, and an "other state" option button 2315.

Figure 24:
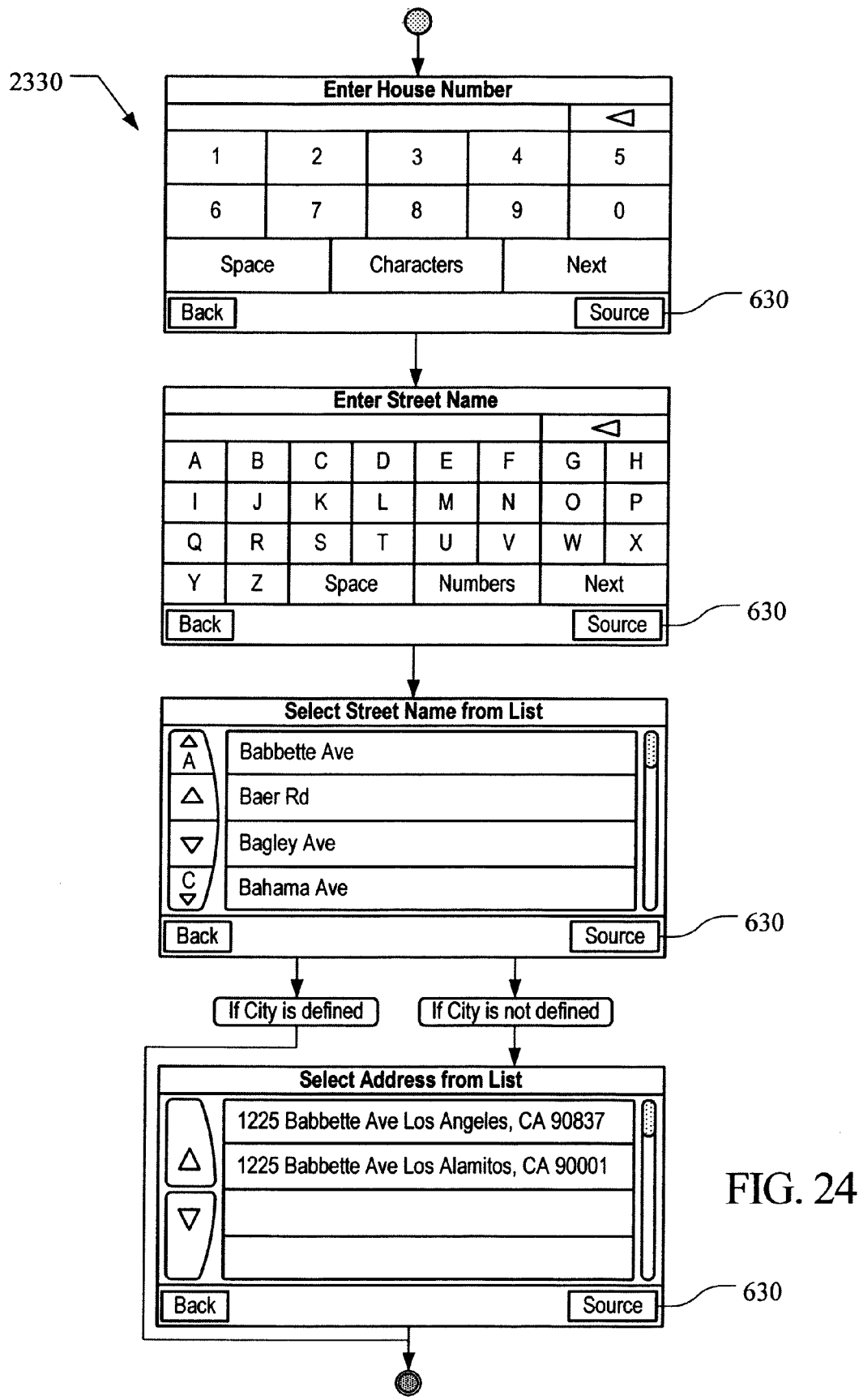
FIG. 24 shows an exemplary set of screens that may be used to enter the street number and/or street name of a desired destination.

User activation of the default state selection button 2305 may direct the navigation user interface to display the street name/city search option menu 2320, which may be used to determine how the destination address will be entered. The street name button 2325 invokes one or more menus at 2330 that may be used to enter the street number and/or street name of the desired destination. An exemplary set of screens that may be used to enter the street number and/or street name of the desired destination is shown in FIG. 24. If a city is not defined in this search, the user may select the correct address in the correct city from a list provided from a search of an internal database of main module 105. As shown in FIG. 24, the street name may be selected from a list provided from the internal database. If a city is not defined in the search, the user may select the correct address in the correct city from a list provided from the internal database.

Figure 25:
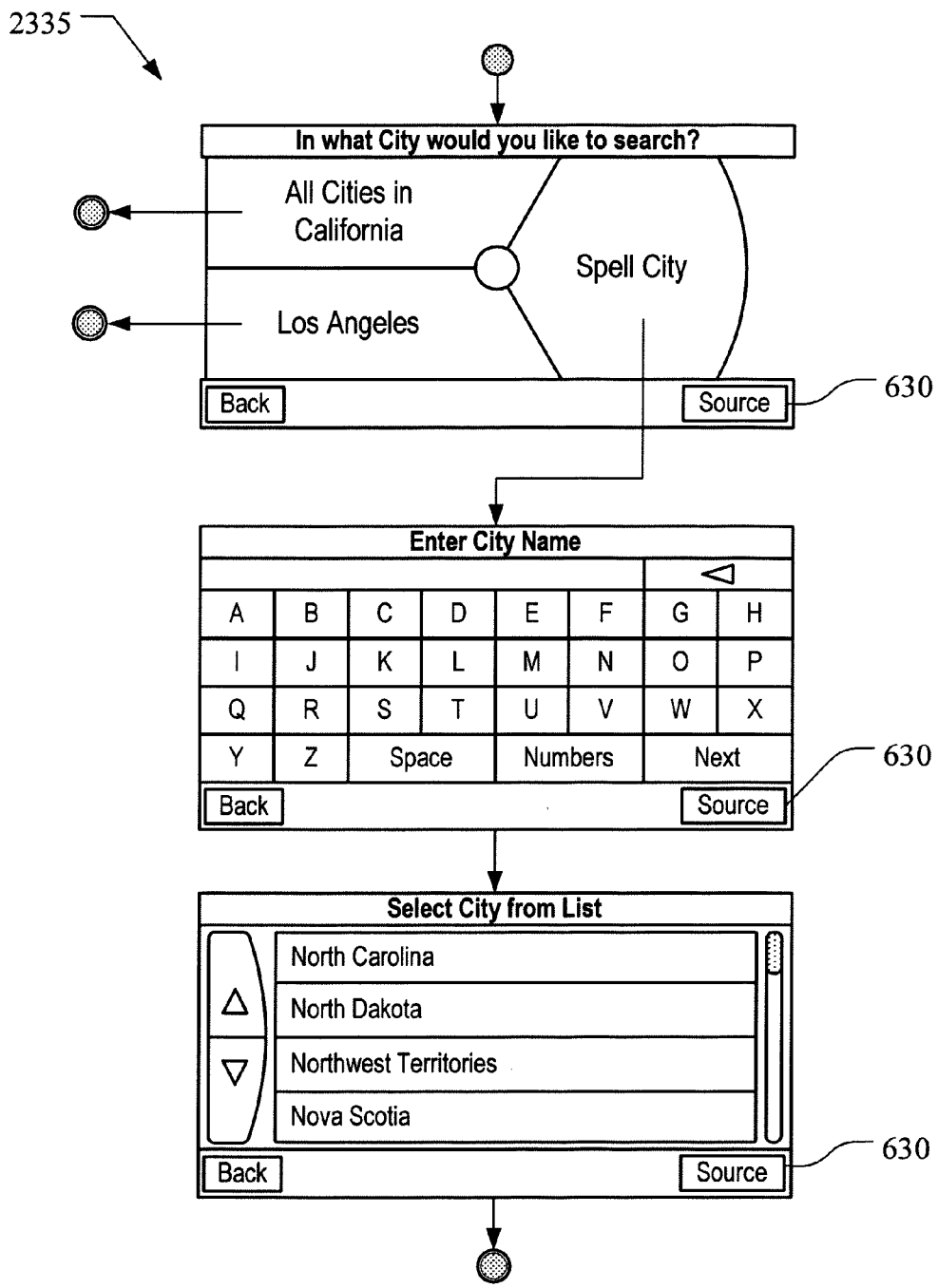
FIG. 25 shows an exemplary set of screens that may be used to select a city of a desired destination.

Once the street number and/or street name have been entered by the user through one or more menus at 2330, the user may be prompted to select a city using one or more menus at 2335. An exemplary set of screens that may be used to select a city is shown in FIG. 25. The same or similar menus may be invoked upon actuation of the "city" button 2370, after which one or more menus identical or similar to those at 2330 may be displayed.

In the example shown in FIG. 25, there is an "all cities in 'X'" option, where X is populated with the selected state. If the user has recently input a city name, then the top level menu screen of the screen sequence 2335 may be displayed with the recent city shown as a selectable option. Otherwise, the user may enter the name of the desired city by keying it into, for example, a touch pad keyboard. Alternatively, or in addition, the user may select the city name from a list.

A confirmation menu screen 2340 may be provided to allow the user to confirm that the destination information has been properly entered. From the confirmation menu screen 2340, the user may initiate calculation of routing information by the navigation application by activating the "go" button 2345. A map from the current location to the selected destination may be displayed through user activation of the "view map" button 2350. Travel along the calculated route may be simulated in response to user activation of the "simulate" button 2355. Still further, the destination may be saved for subsequent use through user activation of the "save" button 2360.

Figure 26:
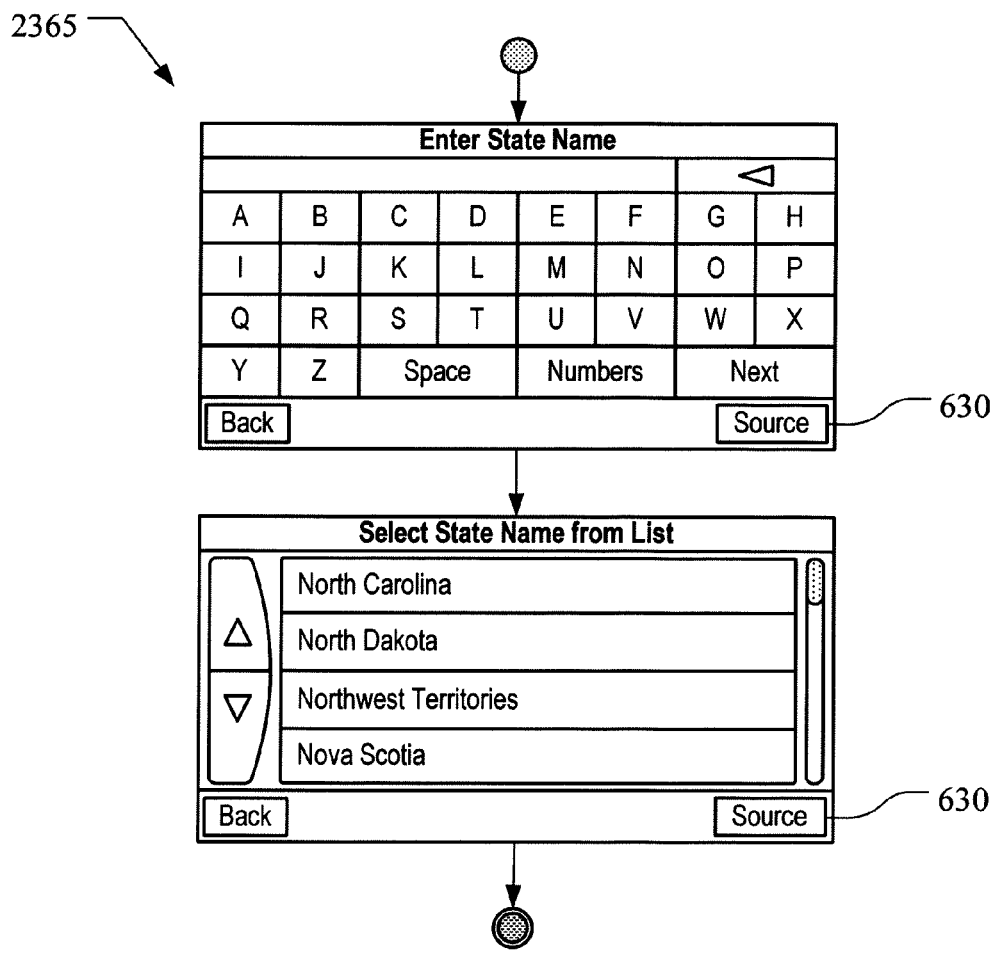
FIG. 26 shows an exemplary set of screens that may be used to select a state of a desired destination.
Figure 27:
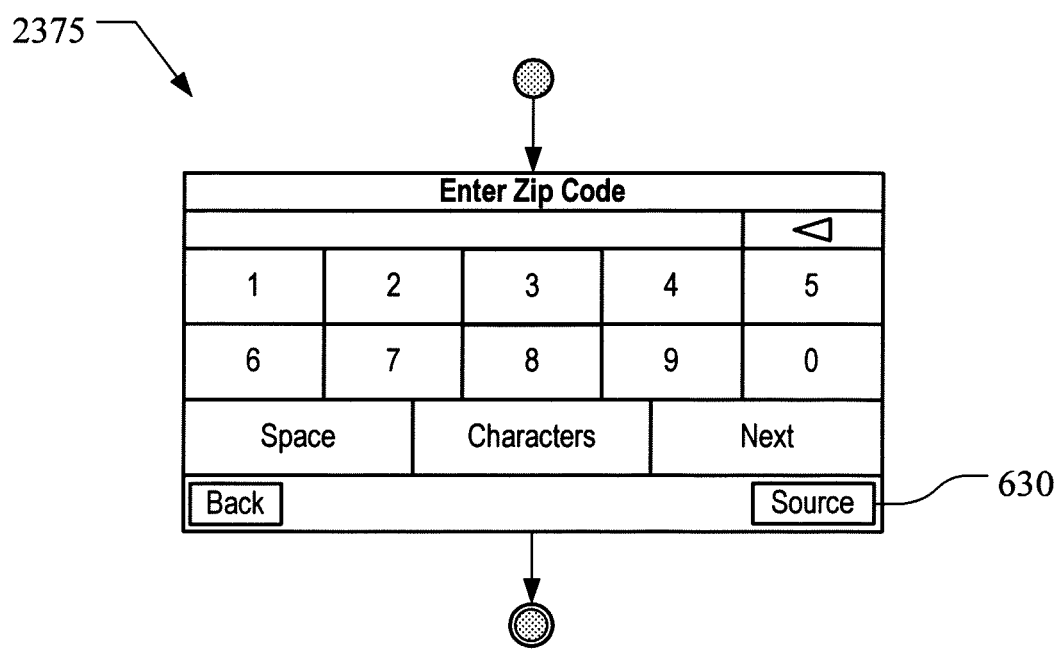
FIG. 27 shows an exemplary set of menus that may be used to enter the ZIP code of the desired destination.

With reference again to menu screen 2300, user activation of the "other state" button 2315 may invoke a sequence of one or more menu screens associated with state selection 2365. An exemplary set of screens that may be used to enter the state of the desired destination is shown in FIG. 26. Upon selection of a state, menu screen 2320 may be displayed. Activation of the "zip code" button 2310 may invoke a sequence of one or more menu screens associated with zip code selection 2375. An exemplary set of menus that may be used to enter the ZIP code of the desired destination is shown in FIG. 27.

Figure 28:
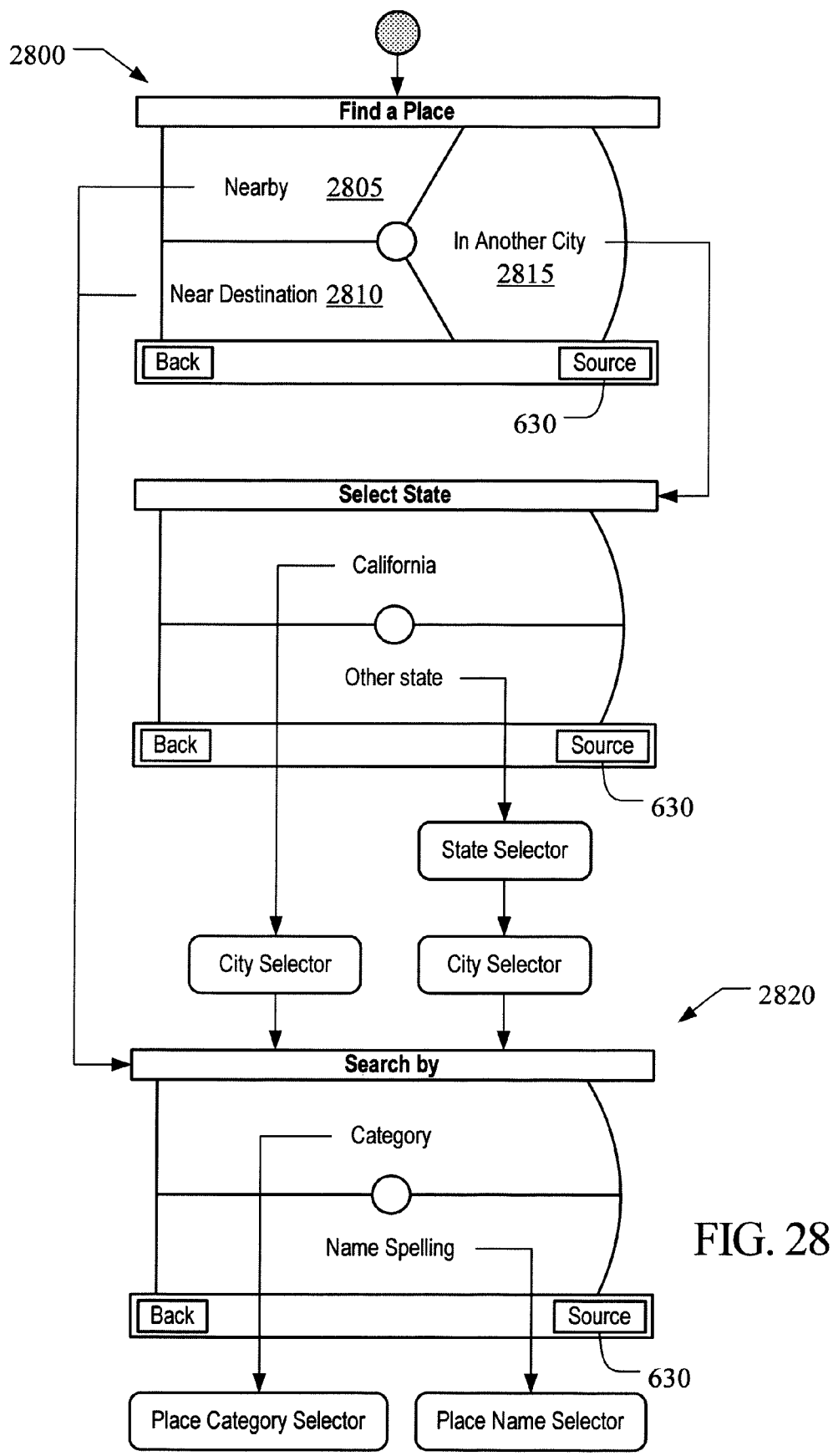
FIG. 28 shows a sequence of screens that may be invoked when the user actuates the "place" button shown in FIG. 22.

FIG. 28 shows a sequence of screens that may be invoked when the user actuates the "place" button 2210 shown in FIG. 22. Using these screens, the user may select a destination from a variety of destination types. To this end, the user is presented with a "find a place" options menu screen 2800. Screen 2800 may provide, for example, a "nearby" button 2805 to invoke one or more further screens to select a place of interest that is close to the current location of the system 100, a "near destination" button 2810 to invoke one or more further screens used in selecting a place of interest that is close to the programmed destination location, and an "in another city" button 2815 to invoke one or more for the screens used in selecting a place of interest that is in another city. If the "in another city" button 2815 is selected, the user may be prompted to select a state, a city, and then to search by name or category. If either the "nearby" button 2805 or "near destination" button 2810 is selected, the user may be prompted to search by category (place category selector) or name spelling (place name selector) as shown at menu 2820.

Figure 29:
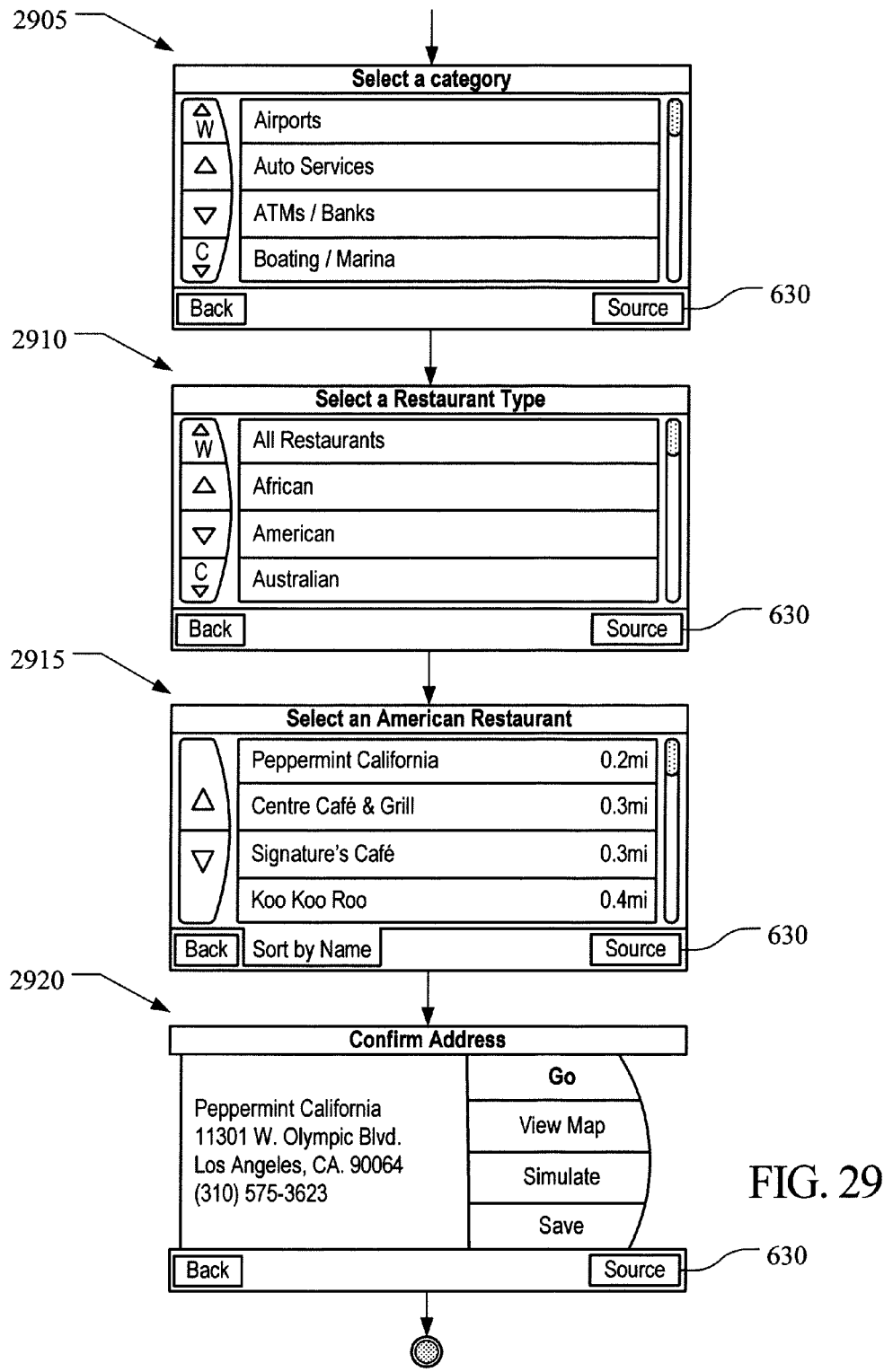
FIG. 29 shows an exemplary place category selector screen sequence.

A sequence of place category selector menus may permit the user to search through predefined categories of points of interest pursuant to selection of the destination location. An exemplary place category selector screen sequence is shown in FIG. 29. In this example, the user may be prompted to select a category (e.g., such as restaurants) using menu layout 2905, select a type within the category (e.g., such as restaurant type) using menu layout 2910, select a specific restaurant in the type category using menu layout 2915, and confirm the address using menu layout 2920. Examples of place groupings and indented sub-groupings that may be employed in system 100 are set forth below. Sub-group lists are displayed when the user selects a major group.

Figure 30:
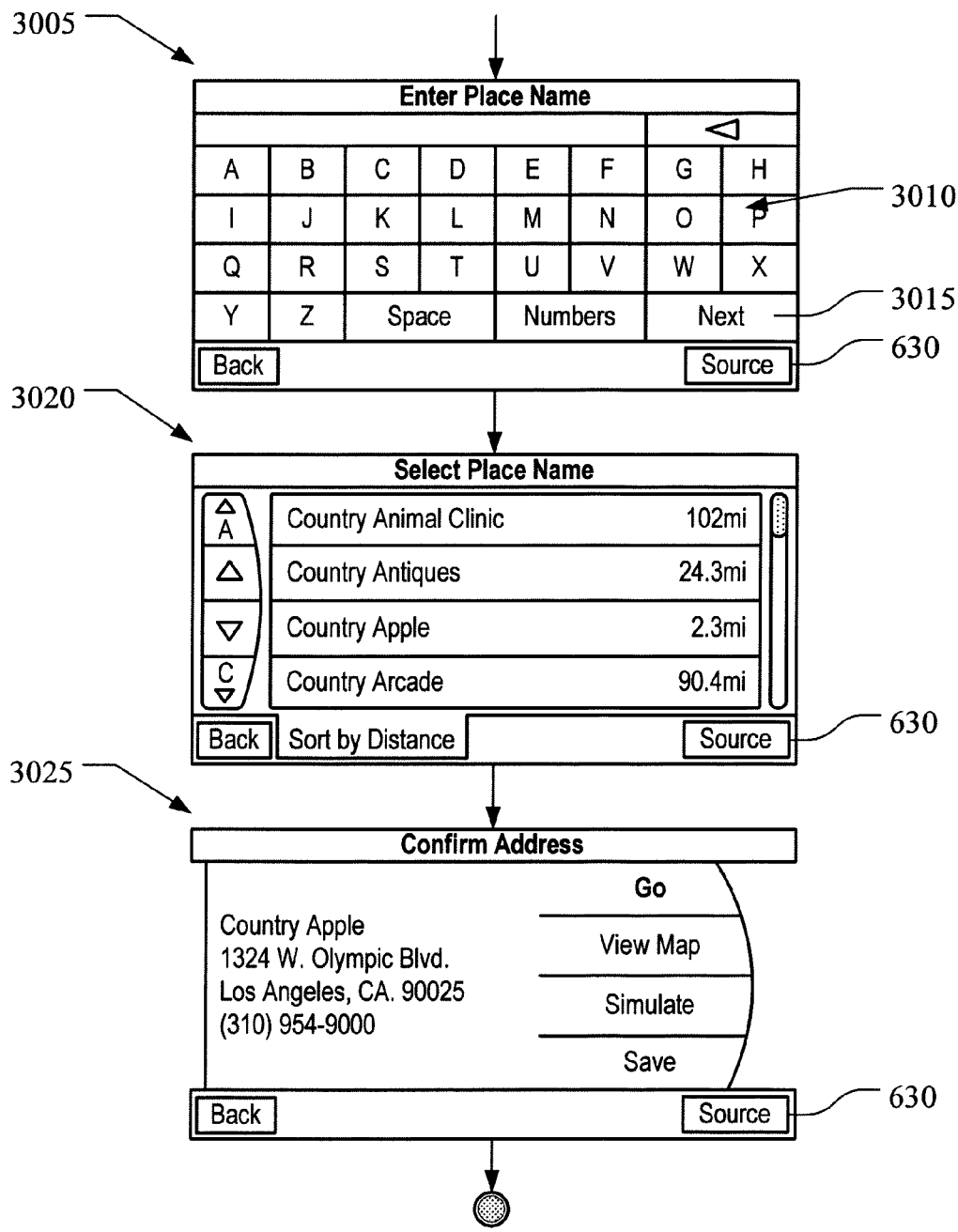
FIG. 30 shows a plurality of screens that may be used to enter a destination based on its place name.

Restaurants and Food
    All Food Types
    Complete list of all food categories
    Wineries
Hotels
Parking
Gas Stations
Auto Services
Transit
    Airports
    Boating/Marinas Ground Transportation
Rest Areas
ATMs & Banks
Shopping
    Shops & Retailers
    Grocery & Liquor Stores
    Home & Garden
Entertainment
    Conventions Centers
    Sports Complexes
    Movie Theaters
    Nightlife
Education
    Libraries
    Museums
    Schools & Universities
Sports
Parks & Recreation
Emergency Services
Government Offices
Local Community
Neighborhoods (a.k.a. Named Places)
Places of Worship FIG. 30 shows a plurality of screens that may be used to enter a destination based on its place name. To this end, place name entry screen 3005 may be displayed when the place button 2210 of place selection menu 2200 is actuated by the user. The place name entry screen 3005 may include a keyboard 3010 that is used to enter alphanumeric characters that are used to initiate a word search for the place name. Once at least a partial entry of the place name is made by the user, the user may actuate the next key 3015 to display a place name selection screen 3020, which may include a list of places that begin with the alphanumeric characters entered by the user on screen 3005. After the user selects the place name of the desired destination, a confirmation screen 3025 may be displayed that allows the user to begin navigation routing, view a map to the selected destination, simulate travel to the desired destination, and/or save the selected destination for later use.

The speller screens shown in the examples above may be used to enter letters, numbers, and other characters into a search entry field. The speller screens may assist the user in selection of an entry by dynamically graying out letters and numbers that are not available in the remaining database search results. When the list of possible entries is less than a predetermined number, the system may display a results list without user intervention. The smart speller also may display the number of possible entries remaining so that a user may decide if they would like jump view a results list. If the smart speller application cannot update the screen with the correct grayed out letters in less than a predetermined time, then the smart speller application may be disabled and the user may enter any character.

If the user enters partial or incomplete data, the system 100 may display a list of possible results. For example, if the user enters the letters "Bee" for a street name and selects the Next button, the system may present the user with a list of streets that begin with the letters "bee" (such as Beech, Beech Knoll, and Beethoven).

The smart speller screens may be toggled through in order by successively selecting the Numbers, Character, and Letters buttons on the respective screens. Exemplary letter and number entry screens are shown in FIG. 24. The special characters needed to complete data entry for all of the languages used in the system may populate the multiple entry keys once a final set of languages has been selected for use by the user.

With reference to FIG. 22, the place selection menu 2200 may include such other buttons as the city center button 2215, the restaurants button 2225, the gas stations button 2230, the recent places button 2235, the saved places button 2240, and the like. The city center button 2215 may permit the user to jump to a list of cities ordered by nearest-location-first. The restaurants button 2225 may permit the user to jump to a search of local restaurants. The system 100 may display an "All Food" category followed by an alphabetical list of other food categories. The gas stations button 2230 may permit the user to jump to a list of gas stations ordered, for example, is to by nearest-location-first. The recent places button 2235 may provide a list of, for example, the 20 most recently input destinations and places with the last input destination provided at the top of the list. If the destination is a place in the place name database of the system 100 then the name may be displayed instead of the street number and name.

Figure 31:
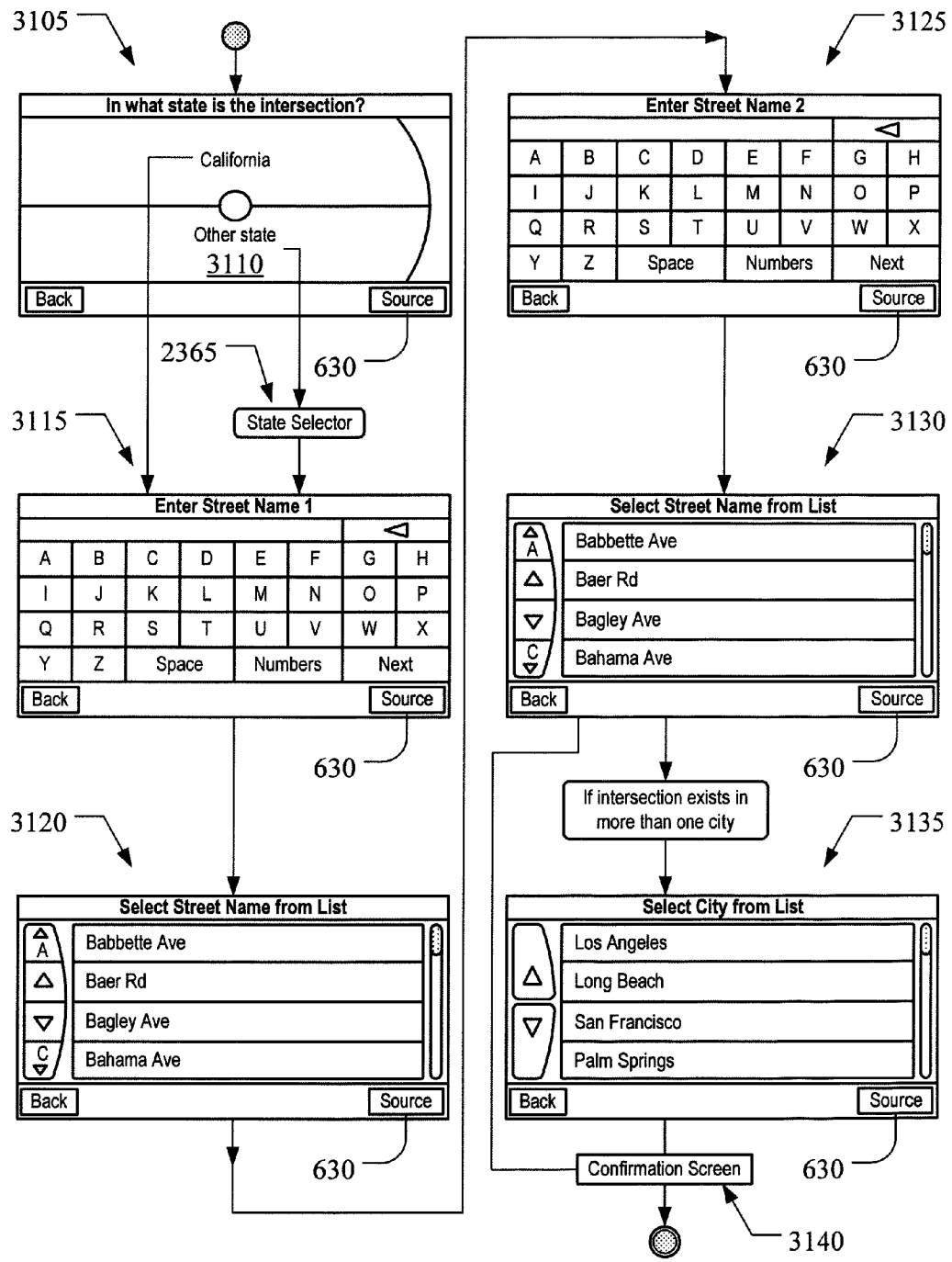
FIG. 31 shows a plurality of screens that may be used in connection with an exemplary intersection search when the intersection button of the place selection menu shown in FIG. 22 is actuated by the user.

A plurality of screens that may be used in connection with an exemplary intersection search when the intersection button 2220 of the place selection menu 2200 is actuated by the user is shown in FIG. 31. In this example, the user may be prompted to enter the state in which the intersection is located using a screen layout such as the one shown at 3105. If the desired state is not shown as an available selection on screen layout 3105, the other state button 3110 may be actuated to initiate one or more screens for state selection, such as those shown at 2365 of FIG. 23. Navigation interface screens 3115 and 3120 illustrate one manner of selecting the desired first street name while navigation interface screens 3125 and 3130 illustrate one manner of selecting the desired second street name. If the intersection exists in more than one city, the user may be prompted to select the desired city using a city selection menu such as the one shown at screen 3135. A confirmation screen may be displayed at 3140 that allows the user to begin navigation routing, view a map to the selected destination, simulate travel to the desired destination, and/or save the selected destination for later use. If the user saves the selected destination, the destination may, if desired, be saved for subsequent selection using the saved places button 2240 of the place selection menu 2200.

Figure 32:
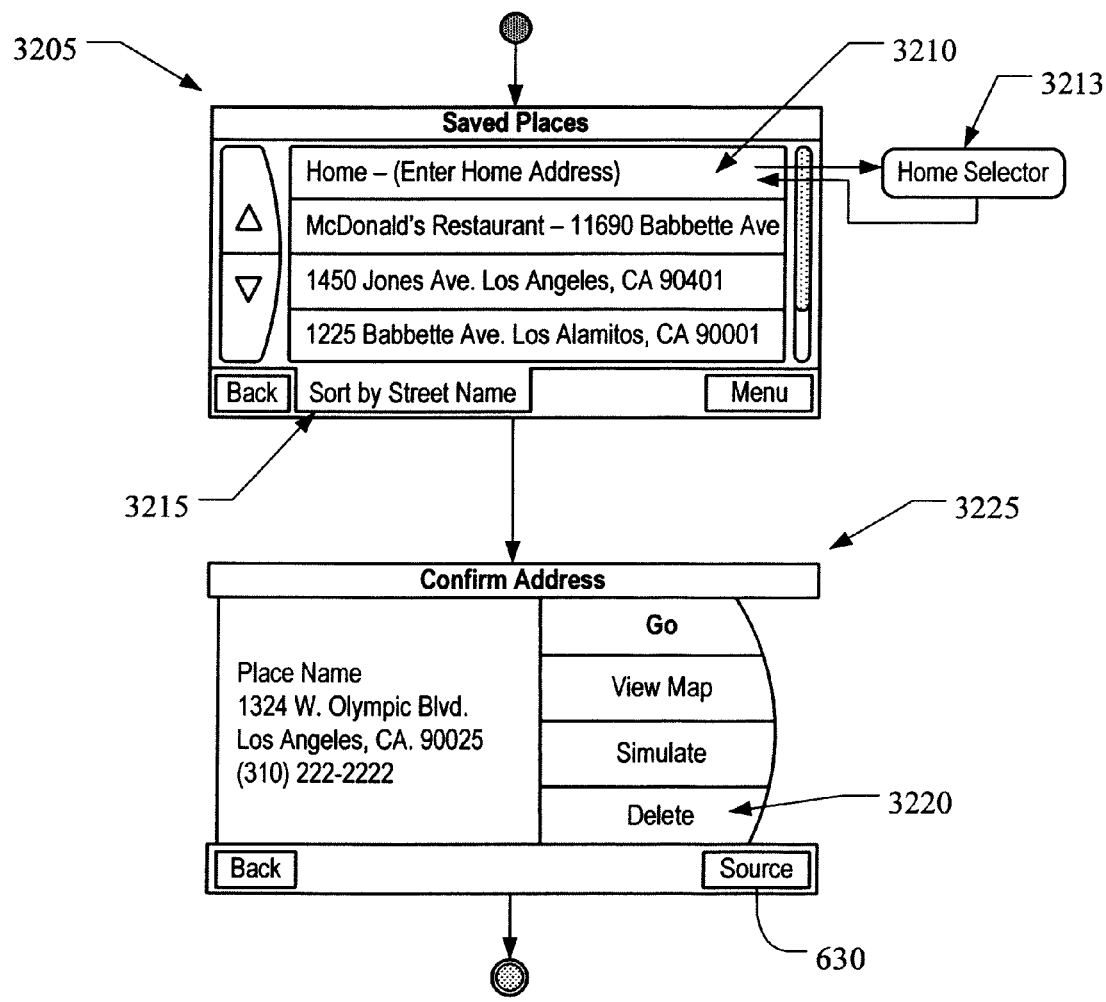
FIG. 32 shows a plurality of screens that may be invoked when the user actuates the saved places button of the place selection menu shown in FIG. 22.

A plurality of screens that may be invoked when the user actuates the saved places button 2240 of the place selection menu 2200 is shown in FIG. 32. As shown, actuation of the saved places button 2240 may result in the display of the saved places screen 3205. In this example, the saved places screen 3205 provides a list of destinations and places that have been saved by the user. The user can save addresses and places from the confirmation screens that are invoked during other destination selection processes. The saved places list may begin with "Home" and have a default ordering of unnamed places, such as places that are designated solely by addresses beginning with a house number. Places that are designated solely by addresses may be followed by named places. Actuation of the "Home" button 3210 directs the navigation interface to a confirmation screen showing the user's predefined home location. If the user has not defined a "Home" location, the navigation interface may present the user with one or more screens 3213 that may be used to designate the desired home location. The "Home" button 3210 may be a different color than the other list buttons.

The list ordering after the "Home" button 3210 may be changed by the user through actuation of the "Sort by Street Name" button 3215. If the user chooses to reorder the list by street name then the "Sort by Street Name" button 3215 may be replaced with a "Sort by Place Name" button. The user can delete a saved place in the confirmation screen after selecting the location using the saved places screen 3205. To this end, the user may actuate the delete button 3220 of the confirmation screen 3225 after selecting the saved location that is to be deleted.

Figure 33:
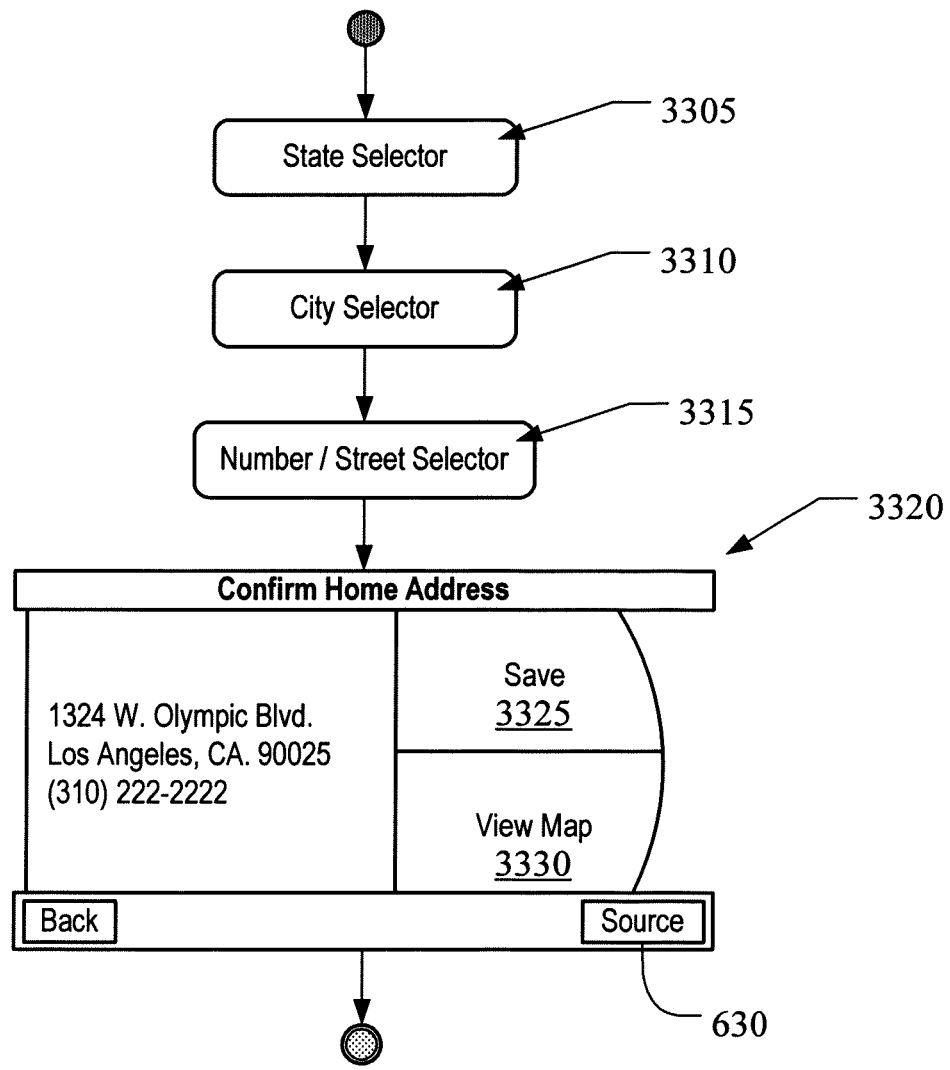
FIG. 33 shows one manner in which the user may select and save the default home location.

The user may select and save the default home location in the manner shown in FIG. 33. In this example, the user may select a state using one or more state selector screens 3305, a city using one or more city selector screens 3310, and a street and street number using one or more number/street selector screens 3315. Once the user has provided the desired information to the system 100, a confirmation screen, such as the one shown at 3320, may be provided to the user. Using the confirmation screen 3320, the user may save the home location through activation of the save button 3325 and/or view a map that includes the home location through activation of the view map button 3330.

Figure 34:
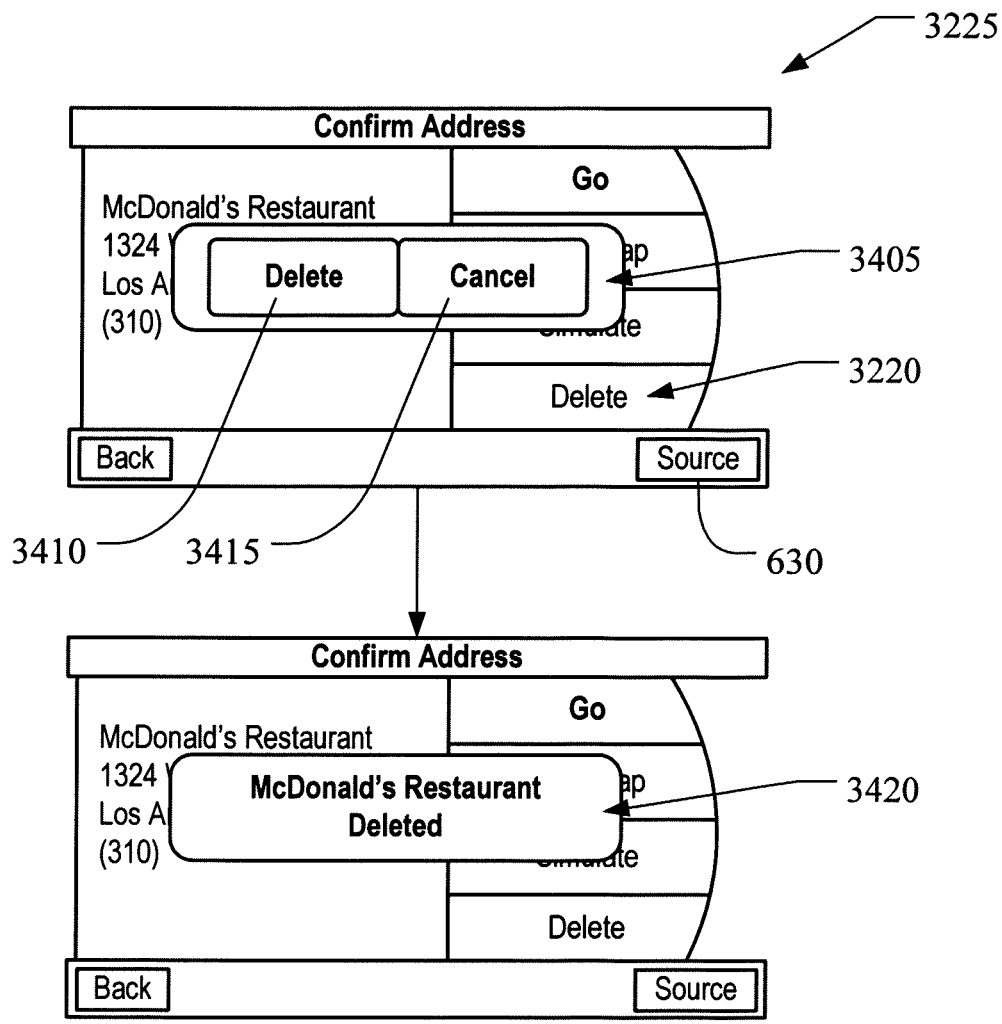
FIG. 34 shows a plurality of screens that may be employed when the user actuates the delete button shown in FIG. 32 to delete a place from the saved places list.

FIG. 34 shows a plurality of screens that may be employed when the user actuates the delete button 3220 to delete a place from the saved places list. As illustrated, the navigation interface may display a pop-up menu 3405 that prompts the user to confirm deletion of the displayed saved place. To this end, the pop-up menu 3405 may include a delete button 3410 and a cancel button 3415. Activation of the cancel button 3415 returns the user to the address confirmation screen 3225 and cancels the place deletion process. Final deletion of the saved place is accomplished when the user activates the delete key 3410. When the delete key 3410 has been activated, the displayed saved place is removed from the system 100 and a confirmation to this effect is provided on an informational pop-up screen 3420, which may be displayed for a predetermined limited time, such as, for example, three seconds.

Figure 35:
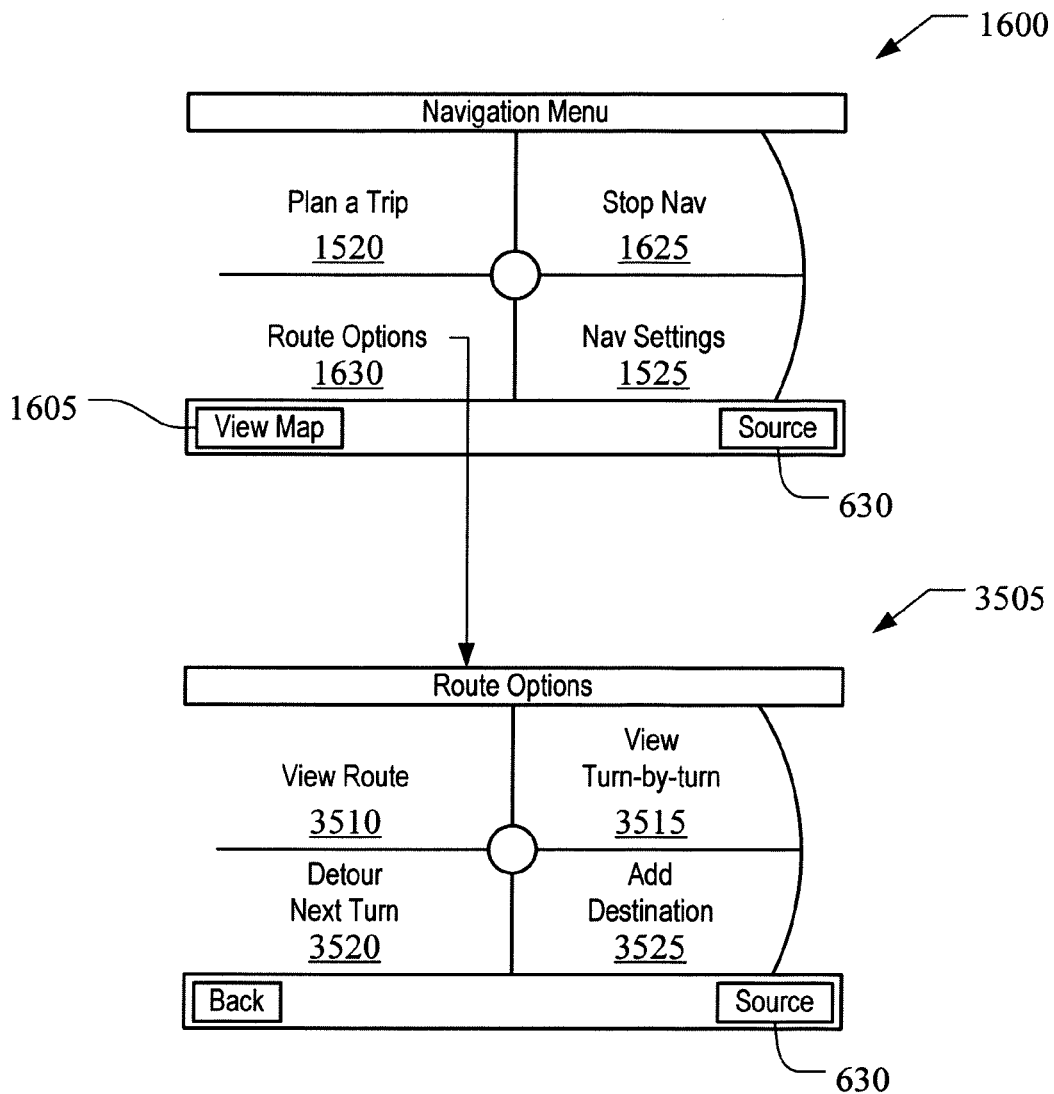
FIG. 35 shows a route options screen that may be displayed when the user actuates the route options button of the navigation menu.

When the user actuates the route options button 1630 of the navigation menu 1600, a route options screen such as the one shown at 3505 of FIG. 35 may be displayed. The route options screen 3505 may provide the user non-recurring optional changes to any currently entered route. The route options button 1630 may be available from the navigation menu 1600 whenever the navigation application is engaged in conducting a navigation function with respect to a destination that has been entered by the user. The route options menu 3505 may include a view route button 3510, a view turn-by turn button 3515, a detour next turn button 3520, and an add a destination button 3525.

Figure 36:
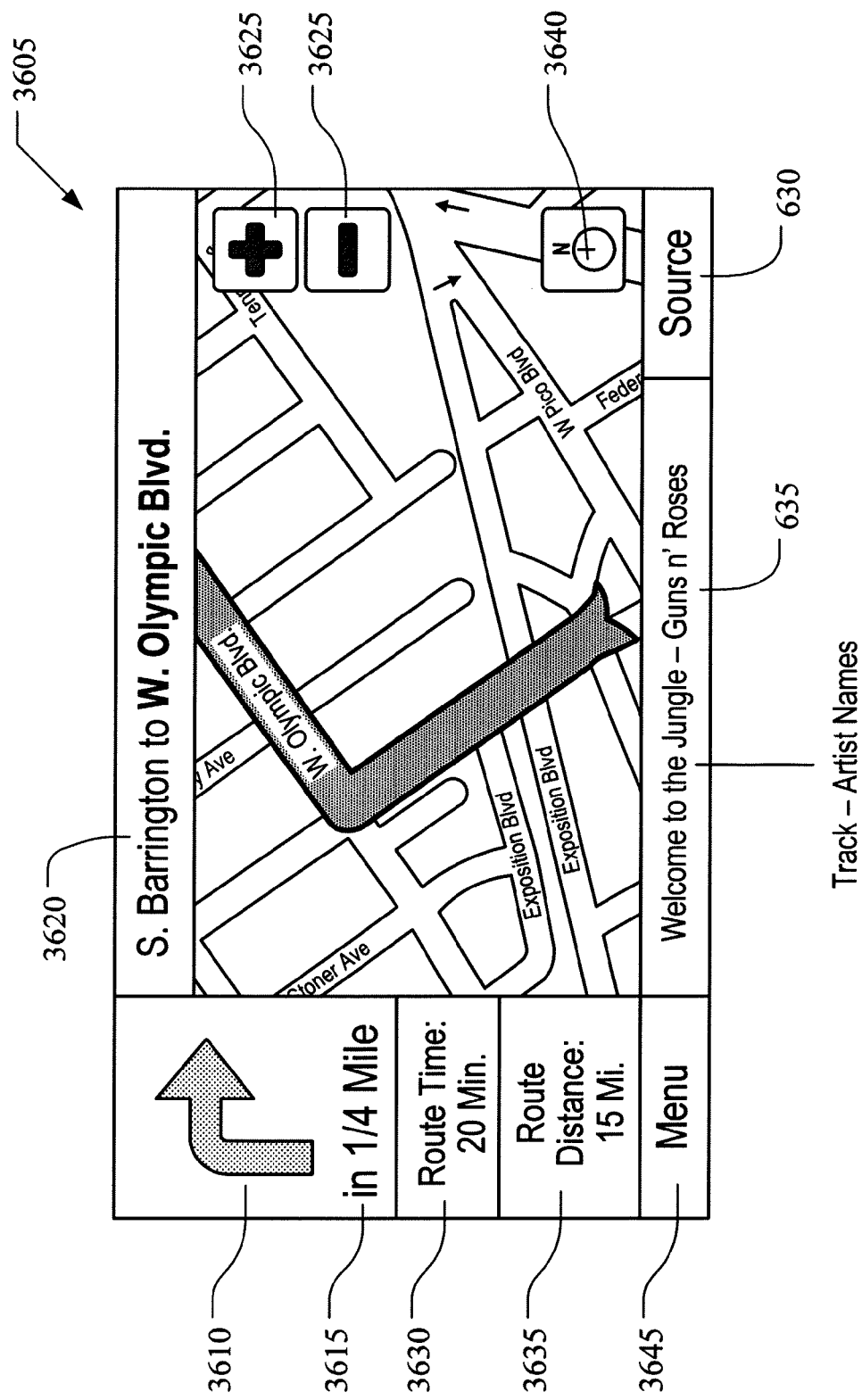
FIG. 36 shows an exemplary map screen that may be presented to the user when the view route button of the route options menu shown in FIG. 35 is actuated.

A map screen, such as the one shown at 3605 of FIG. 36, may be presented to the user when the view route button 3510 is actuated. The specific manner in which the map is displayed, such as whether it is displayed as a 2-D map, a 3-D map, north-up, and the like, may be provided in system 100 as user selectable options. In the example shown in FIG. 36, the map screen 3605 is presented as a North Up, 2D map having the current route highlighted. The destination may be marked with an icon (not shown). If multiple destinations have been entered, each destination may be marked with an icon.

The map screen 3605 may display the following information using anti-aliased fonts, graphics, and some alpha-blended overlays:
  Present Street (optionally displayed at 635 if no media is currently being played back)
  Upcoming Maneuver Graphic (3610)
  Distance to Upcoming Maneuver (3615)
  Maneuver Point Street Name (3620) including, if desired, exit number and/or exit name for highway exits
  Discrete zoom in/out controls (3625)
  Time to Destination (3630)
  Distance to Destination (3635)
  Highlighted Route
  Compass (3640)
Additionally, the map screen may display the following under the appropriate circumstances:
  No GPS Signal Indicator
  Low Battery Indicator
  Muted speaker icon
  Car icon The car icon may be centered horizontally at the bottom of the area containing the map. If the user switches between a regular map view and a detailed map view, the system may re-center the entire map inside the selected screen format. The map shown in the map screen 3605 may have three user selectable map orientation settings: 2.5D) heading up, 2D heading up and 2D north up. These settings may be toggled through by pressing the compass button 3640. The user may access the current trip's information screen by pressing the menu button 3645. If there is no route active then this area may display the current speed.

A detailed map screen may be accessed and exited when the user presses the upcoming maneuver graphic 3610. The detailed map screen may be similar to the primary map screen except that the upcoming maneuver information may be larger and may include an icon overlaid onto a display of the actual upcoming maneuver (i.e., shown as a heading up 2D map). The distance to maneuver, time to destination, and distance to destination may be reformatted to accommodate the larger graphic.

When the media application is playing an audio file, the track name and artist name of the current audio file may be displayed as a music track button 635 on the map screen 3605. The music track button 635 may be actuated by the user to display a user interface screen associated with the audio application. For example, actuation of the music track button 635 may result in the display of the playback control screen 1700 shown in FIG. 17 for interface with the audio application.

Figure 37:
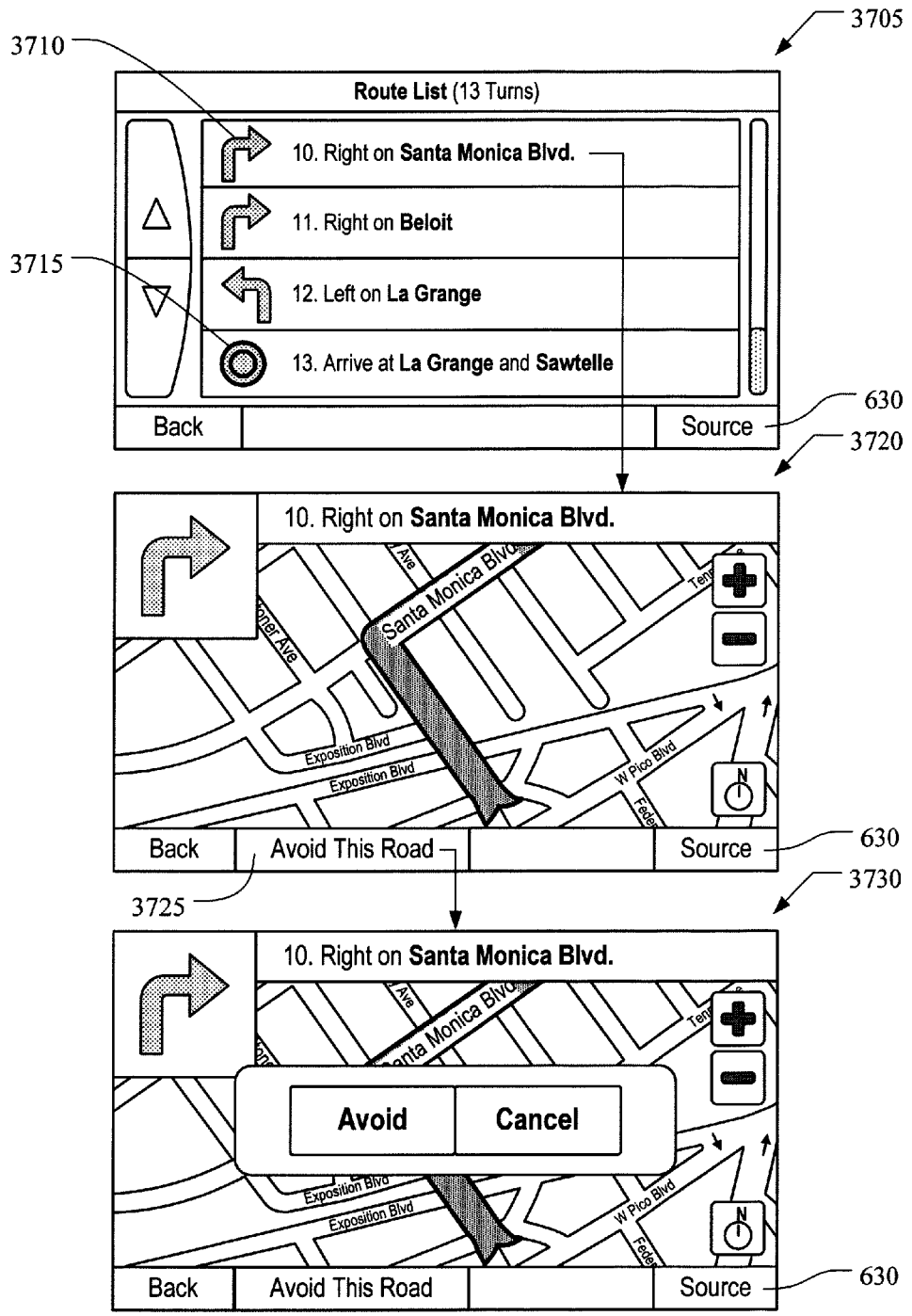
FIG. 37 shows a plurality of screens that may be presented to the user when the view turn-by-turn button of the route options screen is actuated.

FIG. 37 shows a plurality of screens that may be presented to the user when the view turn-by-turn button 3515 of the screen 3505 is actuated. As shown, actuation of the button 3515 may result in the presentation of a route list screen 3705 to the user. The route list screen 3705 may include a list of maneuvers needed to get from the current location to the final destination. Each maneuver description may be preceded with a corresponding maneuver icon 3710. If there are multiple destinations then each destination is preceded with a corresponding destination icon 3715. If the user actuates one of the buttons corresponding to a maneuver, they may be presented with a map of the maneuver as shown at maneuver screen 3720. Using the "avoid this road" button 3725 of the maneuver screen 3720, the user may choose to avoid the road(s) of the selected maneuver. Users may be asked for avoidance confirmation using a pop-up screen as shown at the screen 3730.

Figure 38:
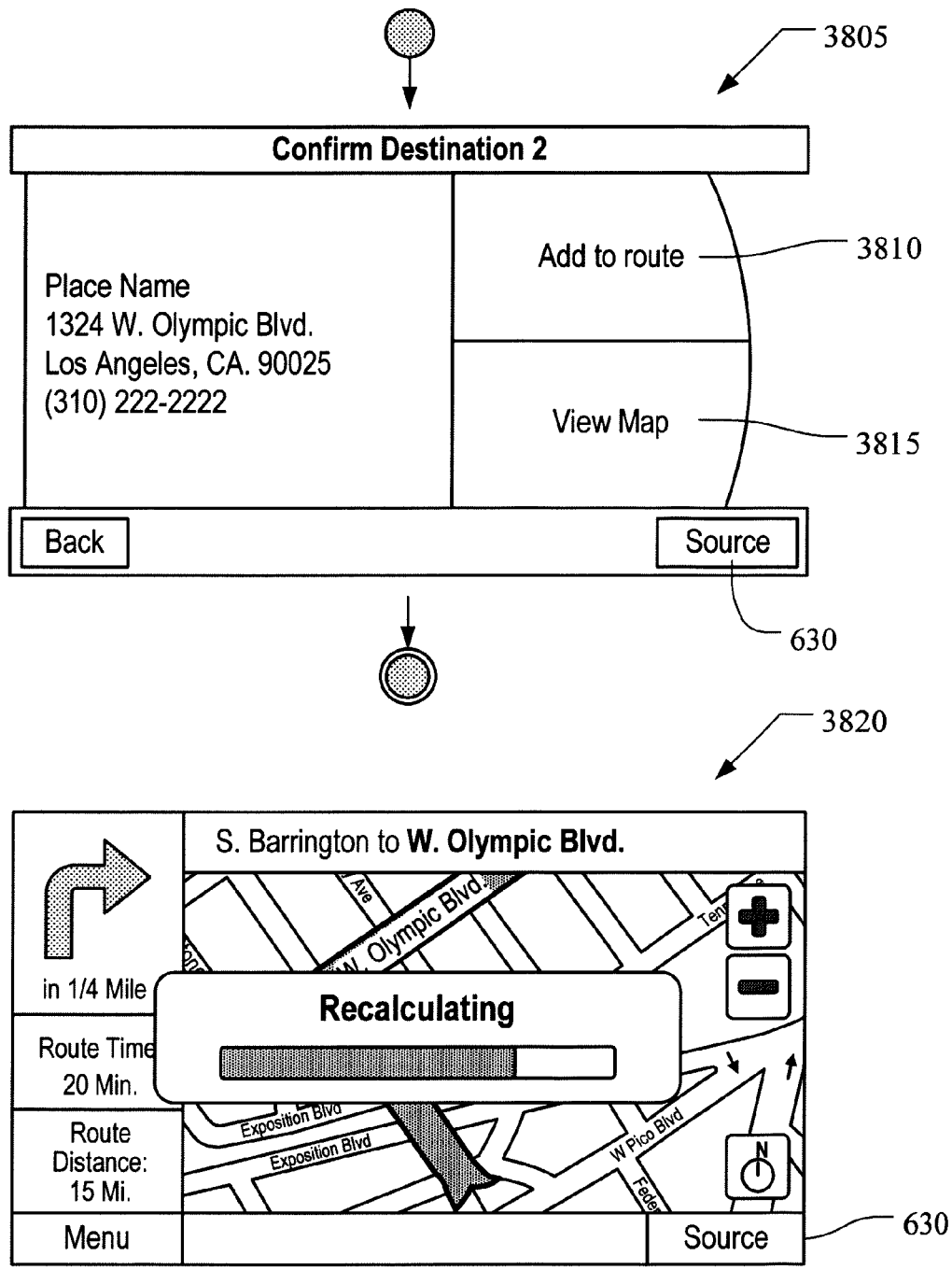
FIG. 38 shows a plurality of screens that may be presented to the user when the user actuates the add destination button of the route options screen.

FIG. 38 shows a plurality of screens that may be presented to the user when the user actuates the add destination button 3525 of the route options screen 3505. Prior to the display of the confirm further destination screen 3805, the user may enter the further destination in the manner associated with any of the selections from the place selection menu 2200. When the user is finished entering the data for the additional location, the confirm further destination screen 3805 may be displayed. Screen 3805 may be provided with an add to route button 3810 to add the further destination to the current route. The user also may view a map that includes the further destination by actuating the view map button 3815 on screen 3805. If the further destination is added to the current route, an acknowledgment screen 3820 may be displayed to indicate that the navigation application is recalculating the current routing information to include the further destination.

Actuation of the detour next turn button 3520 of the route options screen 3505 may be used to direct the navigation application to recalculate the route in a manner that avoids the next maneuver. If desired, an acknowledgment screen such as screen 3820 of FIG. 38 may be displayed to indicate that the navigation application is recalculating the current routing information to avoid the next maneuver.

The media application may employ a plurality of screens that are implemented in accordance with the Centrality multimedia user interface standards to select audio and/or video files for playback, deletion, etc. In accordance with this user interface standard, the media application may search for and present interface screens based on whether the media application is in artist mode, album mode, genre mode, playlist mode, and/or song mode. In artist mode, songs may be listed on an interface screen alphabetically and grouped by artist name. An exemplary screen in artist mode is shown at 1725 of FIG. 17. In each mode, the corresponding screen may include a plurality of buttons such as those shown at 1735, 1740, 1745, 1750, and 1755 that allow the user to select the mode in which the media application is to operate.

In album mode, songs may be listed alphabetically on an interface screen in the order they came in on the album and, further, may be grouped by album. In genre mode songs may be listed alphabetically and grouped by genre. Playlist mode may be available to the user if M3Us are detected on the selected source. If this mode is available, songs are listed in the order they were placed in the playlist. Songs mode may present the user with a screen comprised of a single long list of all songs alphabetically organized by ID3 tag song name. Whether the various items of each of the modes is listed alphabetically, listed in reverse alphabetical order, listed by increasing/decreasing date, listed numerically, or the like, may be selectable by the user as a default in the initial settings, from one or more screens associated with the particular mode, and/or from one or more screens generally associated with the media application.

Once the user has located the desired audio file using the selected mode, the user may actuate a button corresponding to the audio file. Ultimately, the media application may present the user with the playback control screen 1700 showing information relating to the selected audio file while concurrently executing playback of the file. If a file is not playable, the system 100 may display a brief explanation as to why the file is not playable for a predetermined amount of time at, for example, the portion of the screen normally reserved for the track title button. As the system 100 discovers unplayable files, the unplayable file will be skipped. Unplayable files may be grayed out in the list screen and skipped over during playback.

Figure 39:
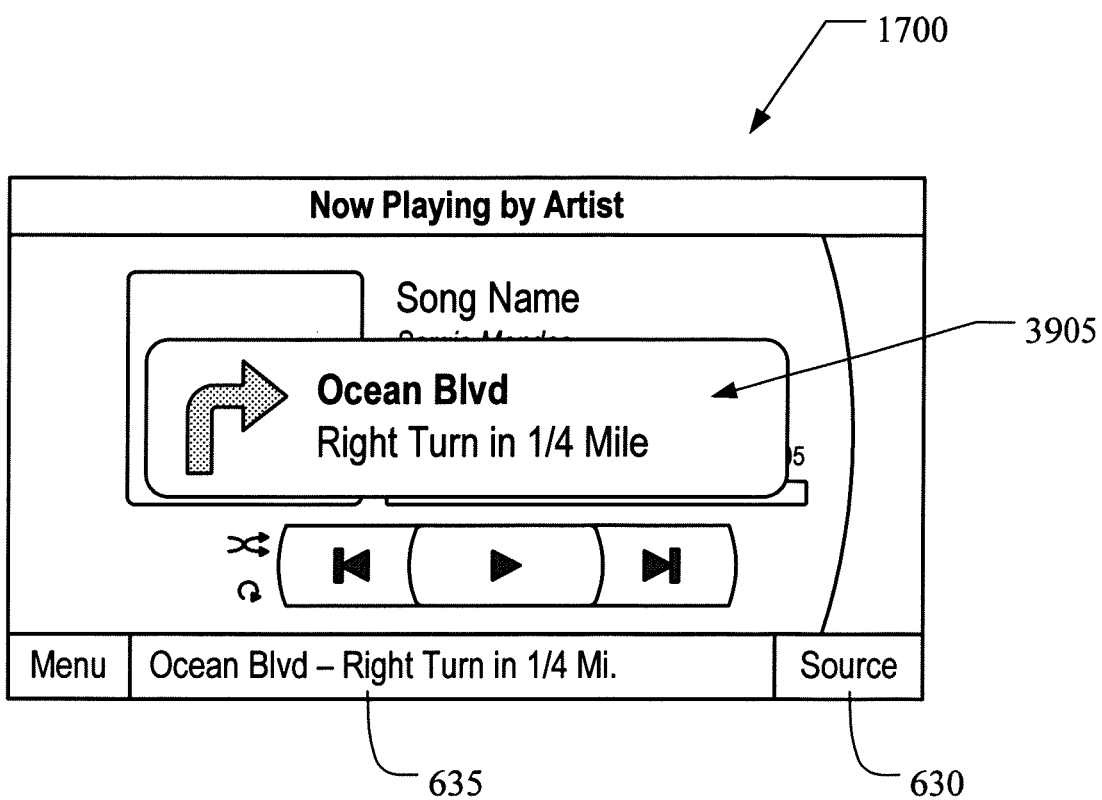
FIG. 39 shows one example of an overlay that may be used by the navigation application to notify the user of upcoming turns.

If desired, the navigation application may notify the user of upcoming turns using an overlay such as the one shown at 3905 of FIG. 39. The overlay 3905 need not be displayed every time the navigation application prepares for an upcoming maneuver. Rather, display of the overlay 3905 may be limited to the first and second to last time a maneuver is announced. Overlay 3905 may be semi-transparent and show a graphic corresponding to the next maneuver. The graphic may be displayed for a predetermined period of time before fading away. Further, if the user wants the pop-up to fade from the screen prior to the expiration of the predetermined period of a time, the user may press anywhere on the screen to promptly remove the overlay 3905 from the screen. Some or all of the buttons of the underlying screen 1700 may remain functional while the overlay 3905 is displayed.

FIG. 40 shows one example of a trip data screen 4005 that may be presented to the user upon actuation of the menu button 3645 of the map screen 3605 shown in FIG. 36. In the trip data screen, the gray boxes 4010 may be populated with alphabetic and/or numeric data.

Figure 41:
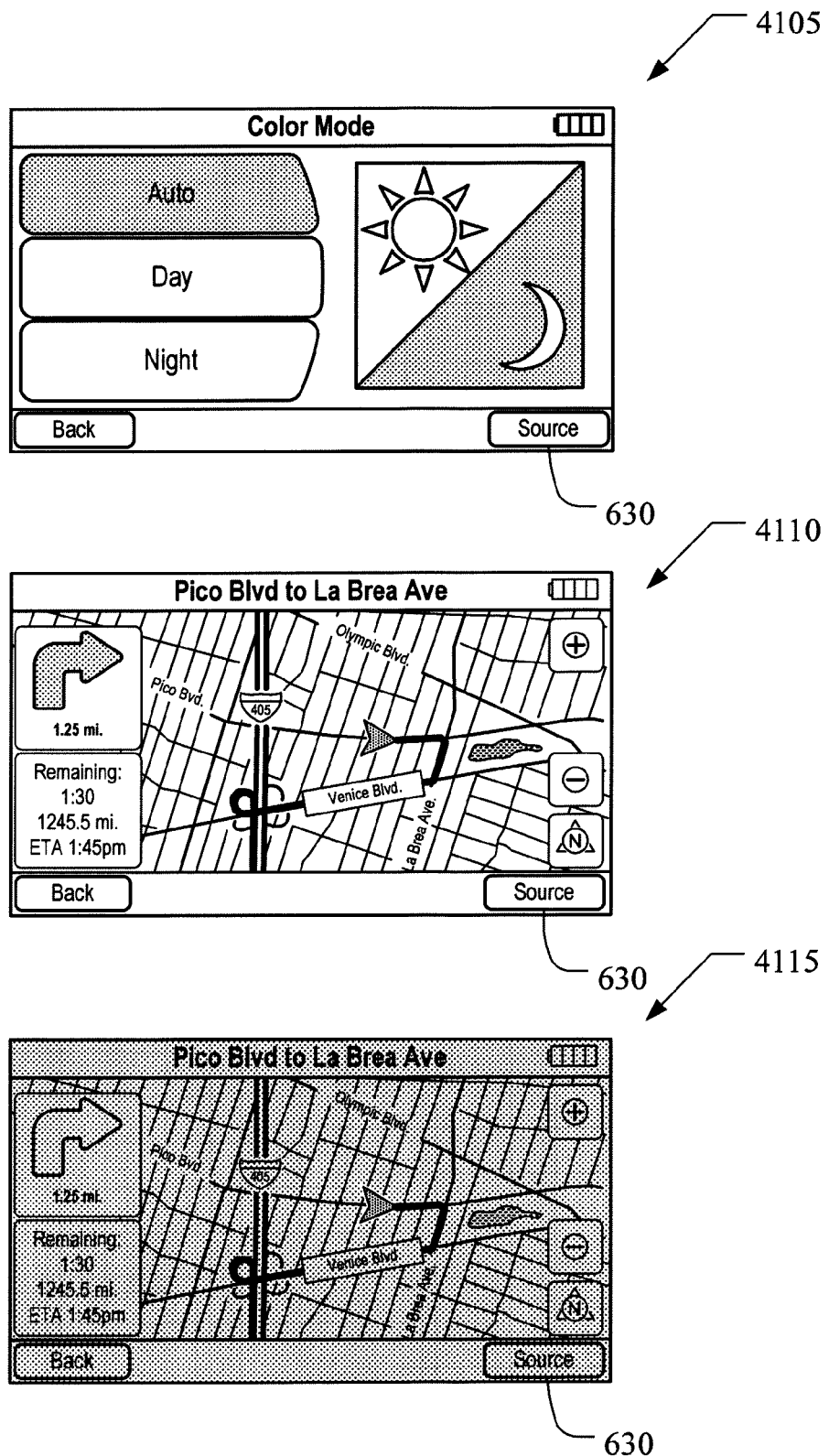
FIG. 41 shows a plurality of screens that may be used to alter the appearance of the screens presented to the user based on the ambient light conditions.

The system 100 may have a light sensor that allows the user interfaces to automatically switch between a daylight mode and a night mode. This to change the graphics of one or more portions of the user interface from a light set of graphics with black fonts to a dark set of graphics with white fonts. The switch from day mode to night mode or night mode to day mode also may be triggered by location specific sunrise and sunset times provided by the GPS and navigation software. Further, the user may turn off the automatic switch and set the system 100 to stay in day mode or night mode in the main system settings menu. Such selections may be available from a mode screen 4105 such as the one shown in FIG. 41. Examples of a day mode and a night mode are shown at 4110 and 4115, respectively, in FIG. 41.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A device with a graphical user interface having navigation and media functionality, the graphical user interface comprising:
    a navigation interface having a plurality of screens adapted to facilitate interaction between a user and a navigation application of the device;
    a media interface having a plurality of screens adapted to facilitate interaction between a user and a media application of the device; and
    an application interface toggle button actuatable on at least one of the plurality of navigation interface screens and on at least one of the plurality of media interface screens, where actuation of the application interface toggle button from the at least one of the plurality of navigation interface screens invokes display of a media interface screen, and where actuation of the application interface toggle button from the at least one of the plurality of media interface screens invokes display of a navigation interface screen, further where the application interface toggle button displays different indicia depending on the screens, such that a media indicia is displayed on the application interface toggle button on at least one of the plurality of navigation interface screens that identifies the media interface application and a navigation indicia is displayed on the application interface toggle button on at least one of the plurality of media interface screens that identifies the navigation interface application.

2. The graphical user interface of claim 1, where one or more of the buttons are virtual buttons.

3. The graphical user interface of claim 1, where the media indicia displayed on the application interface toggle button is indicative of media playback information when the interface toggle button is provided on the at least one of the plurality of navigation interface screens.

4. The graphical user interface of claim 1, where the navigation indicia displayed on the application interface toggle button is indicative of navigation routing information when the interface toggle button is provided on the at least one of the plurality of media interface screens.

5. The graphical user interface of claim 1, where the navigation interface facilitates user input of route destination data.

6. The graphical user interface of claim 1, where the navigation application responds to one or more user inputs through the navigation interface to calculate a route to a destination.

7. The graphical user interface of claim 6, where the navigation interface facilitates display of calculated route information.

8. The graphical user interface of claim 1, where the media application comprises an audio player application adapted to play audio from media storage.

9. The graphical user interface of claim 1, where the media application comprises a video player application adapted to play video from media storage and having one or more video player application states.

10. A device comprising:
 a navigation application facilitating control of a navigation component of the device;
 a navigation interface having a plurality of screens adapted to facilitate interaction between a user and the navigation application of the device;
 a media application facilitating control of a media playback component of the device;
 a media interface having a plurality of screens adapted to facilitate interaction between a user and the media application of the device; and
 an application interface on at least one of the plurality of navigation interface screens and on at least one of the plurality of media interface screens, where the application interface displays a media indicia on the at least one of the plurality of navigation interface screens that identifies the media interface application and the application interface displays a navigation indicia on the at least one of the plurality of media interface screens that identifies the navigation interface application, further where the media indicia and the navigation indicia are not displayed concurrently.

11. The device of claim 10, where the application interface comprises a toggle button that is actuatable, wherein actuation of the media indicia invokes display of a media interface screen, and where actuation of the navigation indicia invokes display of a navigation interface screen.

12. The device of claim 11, where the application interface toggle button displays the media indicia and where the media indicia comprises visual indicia indicative of media playback information when the interface toggle button is provided on the at least one of the plurality of navigation interface screens.

13. The device of claim 11, where the application interface toggle button displays the navigation indicia and where the navigation indicia comprises visual indicia indicative of navigation routing information when the interface toggle button is provided on the at least one of the plurality of media interface screens.

14. The device of claim 10, where the navigation interface facilitates user input of route destination data and responds to one or more user inputs through the navigation interface to calculate a route to a destination.

15. The device of claim 10, where the navigation indicia comprises location information that is displayed on the at least one of the plurality of media interface screens and the media indicia comprises media playback information that is displayed on the at least one of the plurality of navigation interface screens.

16. The device of claim 15, where the navigation interface facilitates display of calculated route information.

17. The device of claim 10, where the media application comprises an audio player application adapted to play audio from media storage.

18. The device of claim 10, where the media application comprises a video player application adapted to play video from media storage and having one or more video player application states.

19. A method for operating a graphical user interface in a device having navigation and media functionality, the method comprising:
 providing a navigation interface having a plurality of screens adapted to facilitate interaction between a user and a navigation application of the device;
 providing a media interface having a plurality of screens adapted to facilitate interaction between a user and a media application of the device;
 providing an application interface that displays a visual indicia different from a type of the interface that is being displayed;
 providing visual indicia from the media interface screen on the application interface provided during a display of the at least one of the plurality of navigation interface screens, wherein the visual indicia identifies the media interface application; and
 providing visual indicia from the navigation interface screen on the application interface provided during a display of the at least one of the plurality of multimedia interface screens, wherein the visual indicia identifies the navigation interface application.

20. The method of claim 19, where the application interface comprises a toggle button, where actuation of the application interface toggle button from the at least one of the plurality of navigation interface screens invokes display of a media interface screen, and where actuation of the application interface toggle button from the at least one of the plurality of media interface screens invokes display of a navigation interface screen.

21. The method of claim 19, where the visual indicia from the media interface screen is indicative of media playback information and is displayed proximate the application interface when the application interface is provided on the at least one of the plurality of navigation interface screens.

22. The method of claim 19, where the visual indicia from the navigation interface screen is indicative of navigation routing information and is displayed proximate the application interface when the application interface is provided on the at least one of the plurality of media interface screens.

23. A device having navigation and media functionality, the device comprising:
 means for providing a navigation interface having a plurality of screens adapted to facilitate interaction between a user and a navigation application of the device;
 means for providing a media interface having a plurality of screens adapted to facilitate interaction between a user and a media application of the device;
 means for providing an application interface toggle button actuatable on at least one of the plurality of navigation interface screens and on at least one of the plurality of media interface screens, where actuation of the application interface toggle button from the at least one of the plurality of navigation interface screens invokes display of a media interface screen, and where actuation of the application interface toggle button from the at least one of the plurality of media interface screens invokes display of a navigation interface screen;
 means for providing a navigation indicia that identifies and activates one of the navigation interface screens on the application toggle button provided during a display of the at least one of the plurality of media interface screens; and means for providing a media indicia that identifies and activates one of the media interface screens on the application toggle button provided during a display of the at least one of the plurality of navigation interface screens.

24. The device of claim 23, where the application interface toggle button comprises a virtual button.

25. The device of claim 23, where the media indicia comprises a visual indicia indicative of media playback information proximate the interface toggle button when the interface toggle button is provided on the at least one of the plurality of navigation interface screens.

26. The device of clam 23, where the navigation indicia comprises a visual indicia indicative of navigation routing information proximate the interface toggle buttons when the interface toggle button is provided on the at least one of the plurality of media interface screens.

* * * * *